(12) United States Patent
Khavakh et al.

(10) Patent No.: US 6,678,611 B2
(45) Date of Patent: Jan. 13, 2004

(54) METHOD AND SYSTEM FOR ROUTE CALCULATION IN A NAVIGATION APPLICATION

(75) Inventors: Asta Khavakh, Lake Zurich, IL (US); William McDonough, Glen Ellyn, IL (US); Oleg Voloshin, Deerfield, IL (US); Yaoguang Wang, Rosemont, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 10/259,897

(22) Filed: Sep. 27, 2002

(65) Prior Publication Data

US 2003/0028319 A1 Feb. 6, 2003

Related U.S. Application Data

(62) Division of application No. 09/920,493, filed on Aug. 1, 2001, now Pat. No. 6,487,497, which is a division of application No. 09/714,314, filed on Nov. 16, 2000, now Pat. No. 6,298,303, which is a division of application No. 09/047,698, filed on Mar. 25, 1998, now Pat. No. 6,192,314.

(51) Int. Cl.[7] .............................................. G01C 21/36
(52) U.S. Cl. ...................................................... 701/210
(58) Field of Search ................................ 701/209, 210

(56) References Cited

U.S. PATENT DOCUMENTS

| | | |
|---|---|---|
| 4,570,227 A | 2/1986 | Tachi et al. |
| 4,763,270 A | 8/1988 | Itoh et al. |
| 4,782,447 A | 11/1988 | Ueno et al. |
| 4,794,528 A | 12/1988 | Hirose et al. |
| 4,796,189 A | 1/1989 | Nakayama et al. |
| 4,812,990 A | 3/1989 | Adams et al. |
| 4,926,336 A | 5/1990 | Yamada |

(List continued on next page.)

Primary Examiner—Gregory C. Issing
(74) Attorney, Agent, or Firm—Frank J. Kozak; Jon D. Shutter; Lawrence M. Kaplan

(57) ABSTRACT

A program and method for route calculation for use with a navigation system and used with a map database that represents a road network in a geographic region. A route calculation program is adapted to find at least one solution route between a first location on a road network and a second location on the road network. The route calculation program includes a first search tree associated with the first location and a second search tree associated with the second location. Each search tree is adapted to hold gates. Each of the gates represents a physical position on the road network and a direction from the position to another location along a path on the road network. The route calculation program also includes at least one priority queue associated with one of the search trees. The priority queue assigns a priority to one of the gates in the associated search tree based upon an evaluation using a search algorithm. The gate identified as having a higher priority than any other gate in its respective search tree is expanded to determine one or more successor gates thereof. Each of these successor gates so formed is compared to the gates in the other search tree. The process of growing at least one of the search trees by expanding the gate in the search tree that has a higher priority than any other gate in the search tree is continued until a gate in one search tree corresponds to at least one gate in the other search tree.

16 Claims, 13 Drawing Sheets

U.S. PATENT DOCUMENTS

| | | |
|---|---|---|
| 4,937,753 A | 6/1990 | Yamada |
| 5,031,104 A | 7/1991 | Ikeda et al. |
| 5,041,983 A | 8/1991 | Nakahara et al. |
| 5,103,400 A | 4/1992 | Yamada et al. |
| 5,168,452 A | 12/1992 | Yamada et al. |
| 5,184,303 A | 2/1993 | Link |
| 5,187,667 A | 2/1993 | Short |
| 5,204,817 A | 4/1993 | Yoshida |
| 5,262,775 A | 11/1993 | Tamai et al. |
| 5,272,638 A | 12/1993 | Martin et al. |
| 5,291,412 A | 3/1994 | Tamai et al. |
| 5,291,413 A | 3/1994 | Tamai et al. |
| 5,291,414 A | 3/1994 | Tamai et al. |
| 5,303,159 A | 4/1994 | Tamai et al. |
| 5,311,434 A | 5/1994 | Tamai |
| 5,369,588 A | 11/1994 | Hayami et al. |
| 5,371,678 A | 12/1994 | Nomura |
| 5,410,485 A | 4/1995 | Ichikawa |
| 5,428,545 A | 6/1995 | Maegawa et al. |
| 5,442,349 A | 8/1995 | Inoue et al. |
| 5,459,667 A | 10/1995 | Odagaki et al. |
| 5,467,276 A | 11/1995 | Tsuyuki |
| 5,475,387 A | 12/1995 | Matsumoto |
| 5,502,640 A | 3/1996 | Yagyu et al. |
| 5,506,774 A | 4/1996 | Nobe et al. |
| 5,506,779 A | 4/1996 | Kanki |
| 5,508,930 A | 4/1996 | Smith, Jr. |
| 5,513,110 A | 4/1996 | Fujita et al. |
| 5,519,619 A | 5/1996 | Seda |
| 5,521,826 A | 5/1996 | Matsumoto |
| 5,550,538 A | 8/1996 | Fujii et al. |
| 5,557,522 A | 9/1996 | Nakayama et al. |
| 5,559,511 A | 9/1996 | Ito et al. |
| 5,608,635 A | 3/1997 | Tamai |
| 5,612,881 A | 3/1997 | Moroto et al. |
| 5,638,280 A | 6/1997 | Nishimura et al. |
| 5,652,706 A * | 7/1997 | Morimoto et al. ........... 701/210 |
| 5,659,476 A * | 8/1997 | LeFebvre et al. ........... 701/201 |
| 5,899,955 A | 5/1999 | Yagyu et al. |
| 5,938,720 A * | 8/1999 | Tamai ........................ 701/209 |
| 6,038,509 A * | 3/2000 | Poppen et al. .............. 701/210 |
| 6,128,571 A | 10/2000 | Ito et al. |

\* cited by examiner

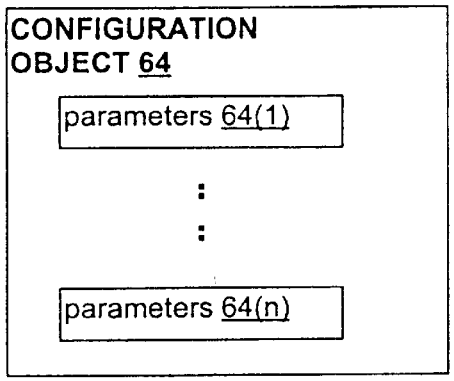
FIG. 5
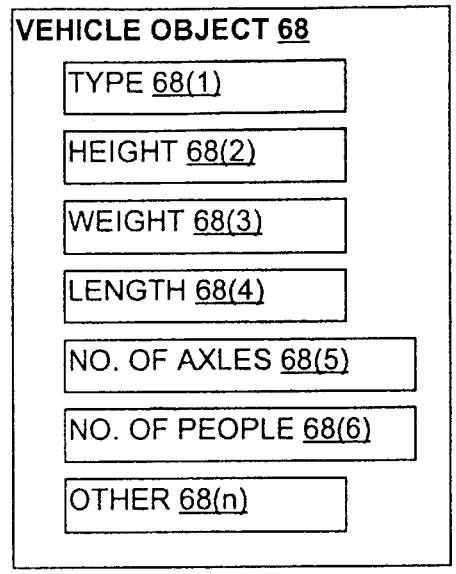
FIG. 6
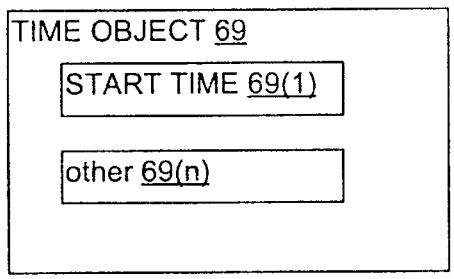
FIG. 8
FIG. 7
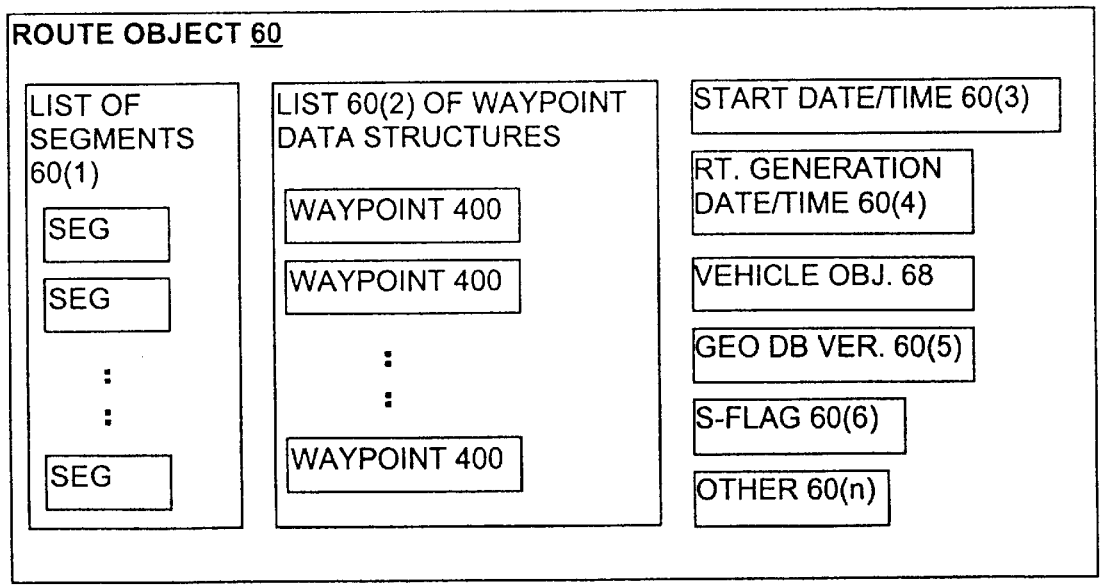

METHOD AND SYSTEM FOR ROUTE CALCULATION IN A NAVIGATION APPLICATION

REFERENCE TO RELATED APPLICATION

The present application is a divisional of Ser. No. 09/920,493 filed Aug. 1, 2001 now U.S. Pat. No. 6,487,497, which was a divisional of Ser. No. 09/714,314 filed Nov. 16, 2000, now U.S. Pat. No. 6,298,303, which was a divisional of Ser. No. 09/047,698 filed Mar. 25, 1998, now U.S. Pat. No. 6,192,314, the entire disclosures of which are incorporated herein by reference.

BACKGROUND OF THE INVENTION

The present invention relates to a system and method for route calculation in a navigation application program.

Computer-based navigation systems are able to provide end-users, such as vehicle drivers and as well as others, with various navigating functions and features. For example, some navigation systems are able to determine an optimum route to travel by roads between locations in a geographic region. Using input from the end-user, and optionally from equipment that can determine the end-user's physical location (such as a GPS system), a navigation system can examine various routes between two locations to determine an optimum route to travel from a starting location to a destination location in the geographic region. The navigation system may then provide the end-user with information about the optimum route in the form of instructions that identify the maneuvers required to be taken by the end-user to travel from the starting location to the destination location. The navigation system may be located in an automobile and the instructions may take the form of audio instructions that are provided as the end-user is driving the route. Some navigation systems are able to show detailed maps on computer displays that outline routes to destinations, the types of maneuvers to be taken at various locations along the routes, locations of certain types of features, and so on.

In order to provide these and other navigating functions, present navigation systems include navigation application software programs and use one or more detailed databases that include data which represent physical features in geographic regions. The detailed database(s) includes data which represent the road network in a region, including the roads and intersections in the region and information about the roads and intersections, such as turn restrictions at intersections, speed limits along the roads, street names of the various roads, address ranges along the various roads, and so on. Further, the data may include information about points-of-interest. Presently, the collection of such geographic data and the provision of such data in a computer-usable database format are provided by Navigation Technologies of Rosemont, Ill.

Present navigation application programs and navigation systems are able to provide many advantages and many useful features. However, there continues to be a need for improvement. One area in which there is need for improvement relates to providing the end-user with better and more detailed navigation instructions at an initial stage of a route. Another area in which there is need for improvement relates to providing the end-user with better instructions as the desired destination is approached. Still another area in which navigation systems can be improved relates to providing the end-user with better instructions as to how to get back on a route to a desired destination when the end-user either accidentally or deliberately deviates from a previously calculated route. Still another area in which there is a need for improvement relates to handling of intermediate stops along a route. For example, an end-user will often want to make one or more intermediate stops between a starting location and a final destination. Thus, there is a need for a navigation system application that can not only calculate a route between two locations, but also that can calculate quickly and effectively a route that includes stops at one or more intermediate locations along the way between a starting location and a destination. A further area in which there is need for improvement relates to provision of a universal route calculation module or tool that can be readily used in a variety of different software and hardware environments without the need for extensive revisions and customizations to the tool.

Accordingly, it is an objective to provide a navigation application that provides improved route calculation features to an end-user.

SUMMARY OF THE INVENTION

To address the above concerns, according to one aspect of the present invention, there is provided a program and method for a route calculation tool for use with a navigation system and used with a map database. The route calculation tool is adapted to find at least one solution route between a first location on a road network in a geographic region and a second location on the road network in the geographic region. The route calculation tool includes a first search tree associated with the first location and a second search tree associated with the second location. Each of the search trees is adapted to hold gates. Each of the gates represents a physical position on the road network and a direction from the position to another location along a path on the represented road network. The route calculation tool also includes a priority queue associated with each of the search trees. Starting with one of the search trees, the priority queue assigns a priority to each of the gates based upon an evaluation by a search algorithm. A search engine expands the gate that has the highest priority to determine one or more successor gates thereof and compares the one or more successor gates so formed to one or more gates in the other search tree. The process of growing either or both search trees by expanding the gate that has the highest priority in its respective search tree is continued until a gate in the search tree corresponds to at least one of the one or more gates in the other search tree.

BRIEF DESCRIPTION OF THE DRAWINGS

FIG. 5 is a diagram illustrating the components of the configuration object of FIG. 4.

FIG. 6 is a diagram illustrating the components of the vehicle object of FIG. 4.

FIG. 7 is a diagram illustrating the components of the output route object of FIG. 4.

FIG. 8 is a diagram illustrating the components of the time object of FIG. 4.

DETAILED DESCRIPTION OF THE PRESENTLY PREFERRED EMBODIMENTS

I. Navigation System Overview

Figure 1:
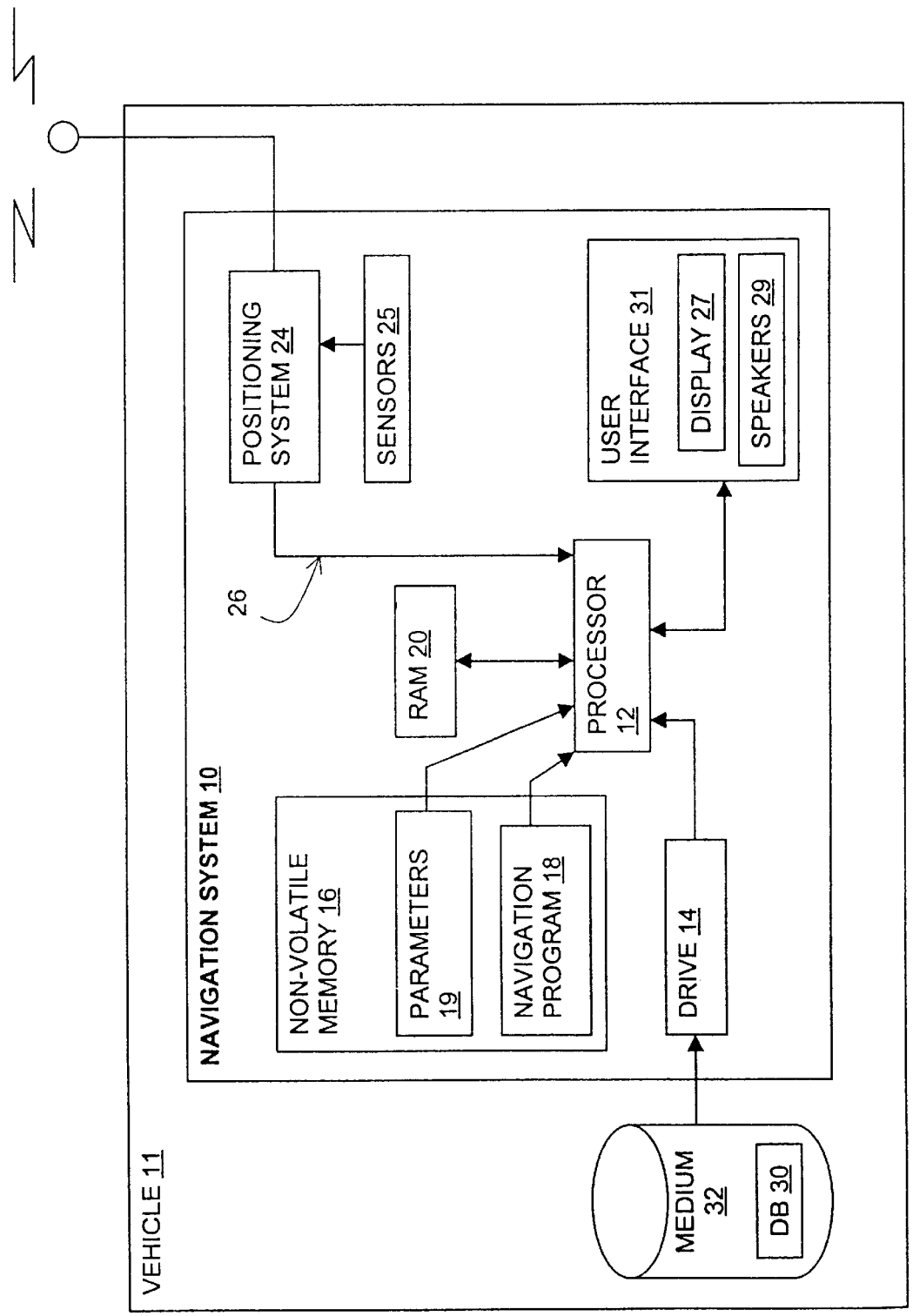
FIG. 1 is a block diagram of an exemplary navigation system.

Referring to FIG. 1, there is a block diagram of a navigation system 10. The navigation system 10 is installed in a vehicle 11, such as a car or truck, although in alternative embodiments, the navigation system 10 may be located outside of a vehicle or may be implemented in various other platforms. For example, the navigation system may be implemented as a hand-held portable system, or may be implemented on a personal computer (such as a desktop or portable notebook) or a personal digital assistant. The navigation system may also be implemented in a networked environment or on a client-server platform.

Referring to the embodiment illustrated in FIG. 1, the navigation system 10 is a combination of hardware and software components. In one embodiment, the navigation system 10 includes a processor 12, a drive 14 connected to the processor 12, and a non-volatile memory storage device 16 for storing a navigation software program 18, as well as other information, such as configuration parameters 19. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

The navigation system 10 may also include a positioning system 24. The positioning system 24 may utilize GPS-type technology, a dead reckoning-type system, or combinations of these, or other systems, all of which are known in the art. The positioning system 24 may include suitable sensing devices 25 that measure the speed, direction, and so on, of the vehicle. The positioning system 24 may also include appropriate wireless communication technology to obtain a GPS signal, in a manner which is known in the art. The positioning system 24 outputs a signal 26 to the processor 12. The signal 26 may be used by the navigation software program 18 that is run on the processor 12 to determine the location, direction, speed, etc., of the navigation system 10.

The navigation system 10 also includes a user interface 31. The user interface 31 includes appropriate equipment that allows the end-user to input information into the navigation system. This input information may include a request to use the navigation features of the navigation system. For example, the input information may include a request for a route to a desired destination. The input information may also include other kinds of information, such as configuration information or vehicle information, as explained further below. The equipment used to input information into the navigation system may include a keypad, a keyboard, a microphone, etc., as well as appropriate software, such as a voice recognition program. The user interface 31 also includes suitable equipment that provides information back to the end-user. This equipment may include a display 27, speakers 29, or other means.

The navigation system 10 uses a map database 30 stored on a storage medium 32. The storage medium 32 is installed in the drive 14 so that the map database 30 can be read and used by the navigation system. The storage medium 32 may be removable and replaceable so that a storage medium with an appropriate map database for the geographic region in which the vehicle is traveling can be used. In addition, the storage medium 32 may be replaceable so that the map database 32 on it can be updated easily.

In one embodiment, the storage medium 32 is a CD-ROM disc. In an alternative embodiment, the storage medium 32 may be a PCMCIA card in which case the drive 14 would be substituted with a PCMCIA slot. Various other storage media may be used, including fixed or hard disks, DVD (digital video disks) or other currently available storage media, as well as storage media that may be developed in the future.

Figure 2:
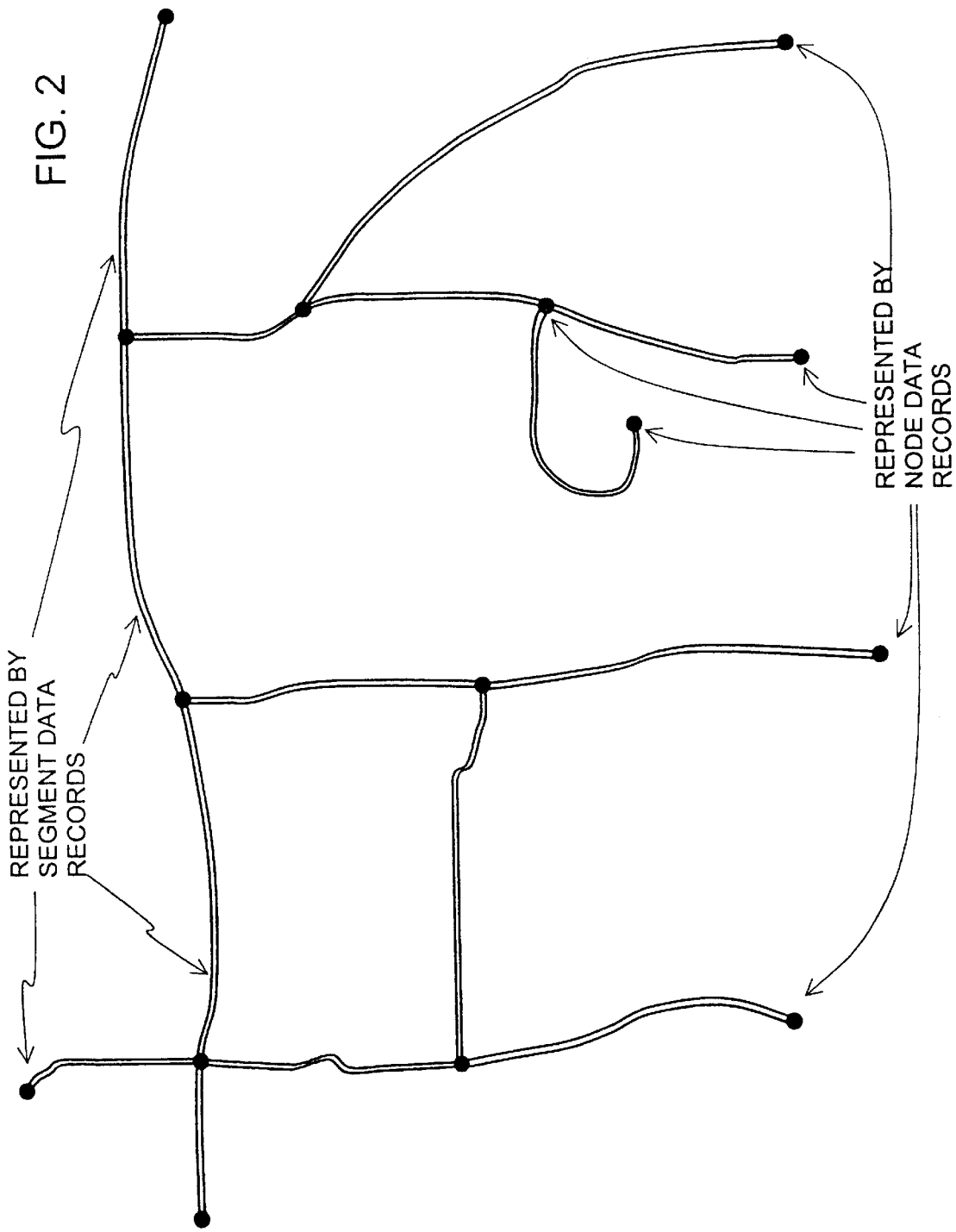
FIG. 2 is a map illustrating physical geographic features in a portion of a geographic region represented by the geographic database in FIG. 1.
Figure 3:
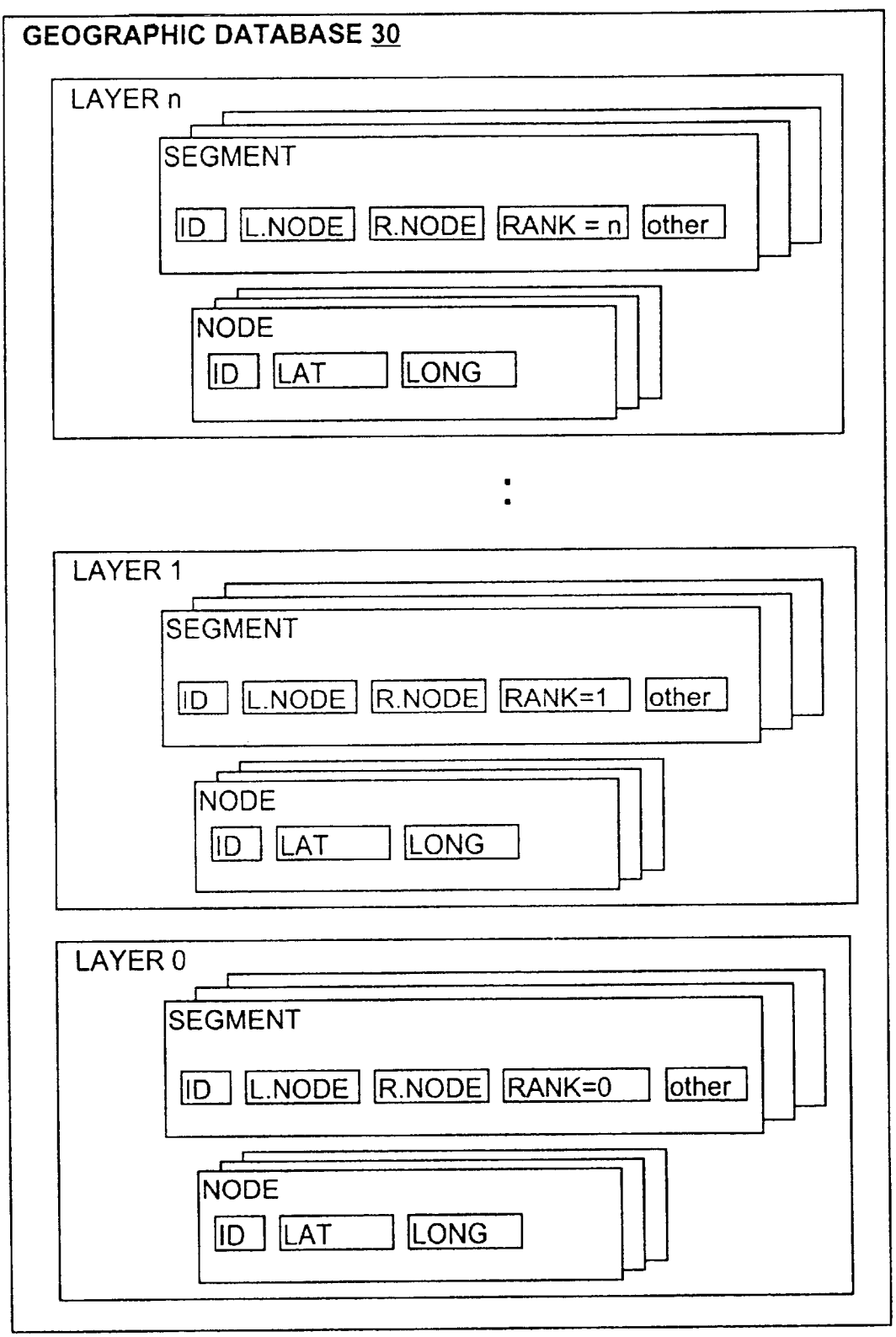
FIG. 3 is a block diagram illustrating the organization of the geographic database in FIG. 1.

The map database 30 contains information about the roadway network in the geographic region. FIG. 2 shows a map illustrating physical geographic features in a portion of a geographic region. FIG. 3 is a block diagram illustrating the data entities that represent the geographic features in FIG. 2. In one embodiment, the map database 30 includes node data and segment data. Node data represent physical locations in the geographic region (such as roadway intersections and other positions) and segment data represent portions of roadways between the physical locations represented by nodes. Each road segment in the geographic region is represented by a road segment data entity (i.e., a record) in the map database 30. Each road segment data record in the map database has two nodes which represent the coordinate positions at each end of the road segment represented by the road segment data record. The data records include information that can be used during route calculation, such as turn restrictions, vehicle access, restricted driving conditions, etc. (The terms "nodes" and "segments" represent only one terminology for describing these physical geographic features and other terminology for these feature is intended to be encompassed within the scope of these concepts.)

In one embodiment of the map database 30, the roadways are classified by rank in accordance with the importance or significance of the roadway for vehicle travel. For example, roadways of rank "0" may be alleyways and side streets, roadways of rank "1" may be primary city streets, roadways of rank "2" may be highways, and so on. Each road segment data record in the map database 30 also identifies the rank of the corresponding portion of the roadway that it represents. As illustrated in FIG. 3, the map database 30 for a geographical area may be stored in layers. The lowest layer ("0") contains records that represent roadways of all ranks, the next higher layer ("1") contains roadways of rank "1" and higher, the next higher layer ("2") contains roadways of rank "2" and higher, and so on. The road segment records may include additional information about the represented road segments, such as the speeds along the represented road segments, turn restrictions, weight restrictions, the names of the roads that the segments are parts of, address ranges along the road segments, and so on. In an alternative embodiment, the geographic database 30 may include more than one rank of road in a single layer. The map database 30 may include additional information as well.

Referring again to FIG. 1, the navigation application software program 18 is loaded from the non-volatile memory 16 into a RAM 20 associated with the processor 12 in order to operate the navigation system. The navigation system 10 uses the map database 30 stored on the storage medium 32, possibly in conjunction with the output 26 from the positioning system 24, to provide various navigation features and functions. The navigation software program 18 may include separate applications (or subprograms) that provide these various navigation features and functions. These functions and features may include route calculation, map display, vehicle positioning (e.g., map matching), route guidance (wherein detailed directions are provided for reaching a desired destination), destination resolution capabilities, and other functions.

II. The Route Calculation Tool Program

A. Overview

Figure 4:
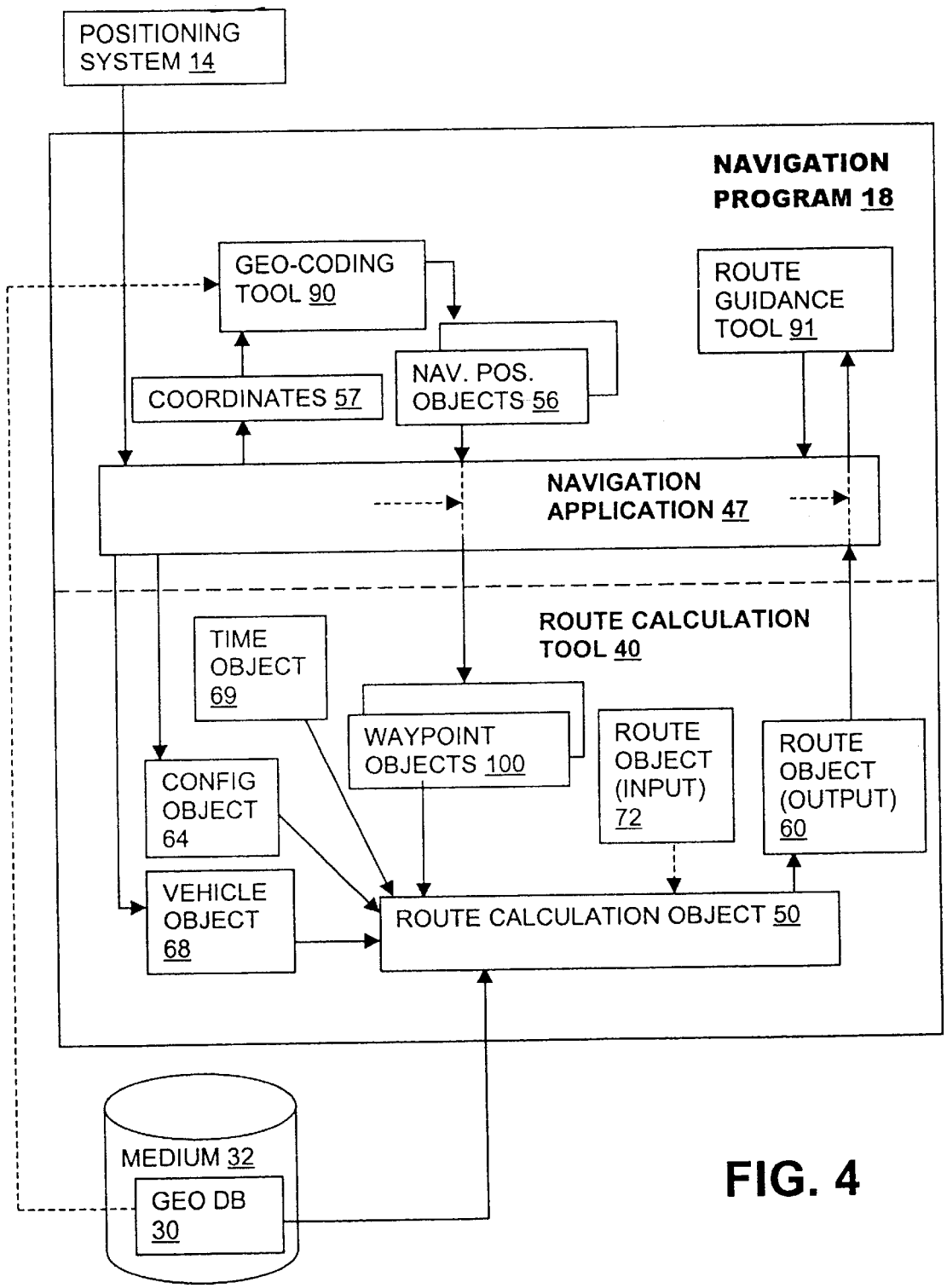
FIG. 4 is a block diagram showing components of the navigation application of FIG. 1.

Referring to FIG. 4, in the navigation software program 18 the route calculation features are provided by a route calculation tool 40. The route calculation tool 40 is a computer program that may be used as part of the navigation software program 18. The route calculation tool 40 determines routes between specified locations. If used with a navigation software program 18 in a navigation system installed in a vehicle, the route calculation tool 40 determines routes for the vehicle to travel. The route calculation tool 40 may be used in combination with the map database 30 and other programs or subprograms within the navigation program 18, or even with other programs outside the navigation program 18 or navigation system 10. Specifically, in the navigation software program 18, the route calculation tool 40 interfaces with a navigation application 47. The navigation application 47 may include appropriate programs that provide the remainder of the navigating functions provided by the navigation system 10, such as route guidance, vehicle positioning, the user interface, and go on. Alternatively, the navigation application 47 may operate as a manager that uses other tool programs, such as a geocoding tool 90, a route guidance tool 91, a map display tool, and so on, to implement one or more of the other various navigation functions.

In a preferred embodiment, the route calculation tool 40 is provided as a module that is relatively portable and that can be incorporated into different kinds of systems. The route calculation tool may be compiled into an executable module with the navigation application or may be used as a standalone program. In a preferred embodiment, the route calculation tool 40 employs an object oriented approach to both its programming, its use of data, and its relationship to the navigation application 47. Each object that forms the route calculation tool receives input data and generates output data according to a predefined function and may invoke methods on other objects. In one present embodiment, each object has its own private memory which is opaque to other objects. In the disclosed embodiment, an object may be used to convey data from one object to another object or may be used to transform data received as input. The route calculation tool 40 is written in the C programming language although in alternative embodiments other programming languages may be used, such as C++ or Java. In general, programming languages that support object oriented programming are preferred.

B. Objects input to and output from the Route Calculation Tool Program

In one embodiment, the route calculation tool 40 comprises a route calculation object 50. This route calculation object 50 receives as input as least two waypoint objects 100 and provides an output in the form of a route object 60. In a present embodiment, the route calculation object 50 may also use as input a configuration object 64, a vehicle object 68, a time object 69, and an input route object 72. (There may be additional objects in addition to these. For example, there may be an object that defines specific application-defined callbacks, i.e., wherein the application may want partial solutions, as described below.)

(1). The configuration object.

Referring to FIG. 5, the configuration object 64 is a data structure that holds parameters 64(1) . . . 64(n), which are used to control the route calculation object 50. Some or all of these parameters may be configurable by the end-user. Some of these parameters may include items, such as weighting factors, that may be used in route calculation. For example, these parameters may include "avoid highways," "avoid U-turns," "determine shortest route," "determine quickest route," etc. These parameters may also include the maximum layer of map data (as represented in FIG. 3) at which route searching is to be performed and whether the route searching should use logical or physical suppression to enforce the maximum layer. Some configurable parameters in the configuration object 64 may be selected by the navigation system manufacturer or by a service technician and thus may not be configurable by the end-user. The data included in the configuration object 64 is stored in a re-writable and non-volatile memory of the navigation system, such as the non-volatile memory 16 (in FIG. 1).

(2). The vehicle object.

Referring to FIG. 6, the vehicle object 68 is a data structure that includes data 68(1) . . . 68(n) that provide the characteristics of the vehicle for which the route will be calculated by the route calculation tool 40. Under some circumstances, characteristics of the vehicle may affect generation of the route. For example, the vehicle object 68 may include data that indicates that the vehicle is a truck having a given weight and number of axles. In such a case, the route searching tool 40 ensures that the calculated route include only roadways with weight limits that allow such a vehicle. In another example, the vehicle object 68 may include information indicating that the vehicle is a passenger vehicle having more than one person on board. The route searching tool 40 can then include lanes restricted to multiple passenger vehicles. The data included in the vehicle object 68 is stored in a re-writable and non-volatile memory of the navigation system, such as the non-volatile memory 16 (in FIG. 1). Some or all of the data in the vehicle object 68 may be configurable by the end-user. Alternatively, some or all may be determined by the navigation system manufacturer or a technician (3). The (output) route object.

Referring to FIG. 7, the output route object 60 is illustrated. The route object 60 is a data structure generated by the route calculation object 50. The output route object 60 includes a single route determined by the route calculation object 50. The route is comprised of a list 60(1) of road segment data records (such as the segment data records described in connection with FIG. 3) that represent portions of roadways that together comprise the calculated route. The route object 60 also contains waypoint information 60(2) describing the origin, destination, and intermediate waypoints and indicating where they are located relative to the list 60(1) of road segments. (This waypoint information is contained in a plurality of route waypoint data structures 400 derived from the route calculation object waypoint data structure 550, described below.) The output route object 60 is provided to the navigation application 47 that uses the list 60(1) of road segment data records and the waypoint information 60(2) in the route object 60 to provide various navigation functions, such as provide instructions to the driver, generate graphical display maps of the route, and so on In addition, the route object 60 may include other items of data. These items may include a start date/time 60(3). This item of data may be derived from the start date/time 69(1), described below. The route object 60 may also include a route generation start date/time 60(4). This item of data corresponds to the date and time at which the route was calculated. The route object 60 also may include a copy of the vehicle object 68, described above. The route object 60 may also include data 60(5) that indicates the version of the geographic database that was used in developing the list of segments 60(1). The route object 60 may also include an "s-flag" item of data 60(6). This item of data indicates whether particular kinds of segment or node records are included in the list of segments 60(1). In particular, in some databases, there are segment records that represent aggregations of individual road segments and node records that represent a plurality of nodes. If either of these kinds of records is included in the list of segments 60(1), the s-flag item of data 60(6) is set. In addition, the route object 60 may include other kinds of data 60(n).

(4). The (input) route object.

When providing certain functions as described in detail below, the route calculation object 50 uses a route object as an input. In FIG. 4, a route object, labeled "72", is shown being used as an input to the route calculation object 50. A route object used as an input may have a similar or identical structure as the output route object 60, shown in FIG. 7. The route object used as an input includes at least a list of road segment data records that comprise a calculated route. The route object used as an input to the route calculation object 50 may be a route object 60 that had previously been calculated by the route calculation object 50. Alternatively, the route object 72 used as an input to the route calculation object 50 may be provided by another program, such as the navigation application 47

The route calculation object 50 uses a route object as an input when information about a previously calculated route is considered when calculating a subsequent route. For example, a route object may be used as an input to the route calculation tool 40 when calculating an alternative route to the previously calculated route represented by the input route object (5). The time object.

Referring to FIG. 8, the time object 69 is a data structure that includes data 69(1) . . . 69(n) concerning a date and time which are used by the route calculation tool 40. Under some circumstances, time characteristics may affect generation of the route. For example, during certain hours of the day, there are turn restrictions that prohibit turns from certain roads onto other roads. The navigation system may allow the end-user to specify a time at which the route will be begun. This may be provided via the user interface 31. The navigation application 47 may include data 69(1) in the time object 69 that indicates the start time for the route calculation. The route calculation tool 40 uses the data in the time object 69 to account for routing time restrictions when calculating the route. The time object 69 may include other data 69(n) as well. Provision of the time object 69 is optional. The time object may also be used to allow the navigation application 47 to specify (and the navigation 40 tool to interpret) a date/time as either year/month/day/hour/minute or "seconds-since-a-base-date/time" and to convert between the two formats.

(6). The waypoint objects (i) Waypoint object overview

As mentioned above in connection with FIG. 4, the route calculation tool 40 receives as input two or more waypoint objects 100. A waypoint object 100 is a data structure used to represent a waypoint. A waypoint refers to a location through which the route to be calculated by the route calculation object 50 is constrained to pass.

In order to calculate a route, the route calculation tool 40 requires at least two waypoint objects 100, one that represents the waypoint corresponding to the origin and another that represents the waypoint corresponding to the destination. One or more additional waypoint objects 100 may be provided to the route calculation tool 40 to represent waypoints corresponding to one or more intermediate locations between the origin and destination.

Figure 11:
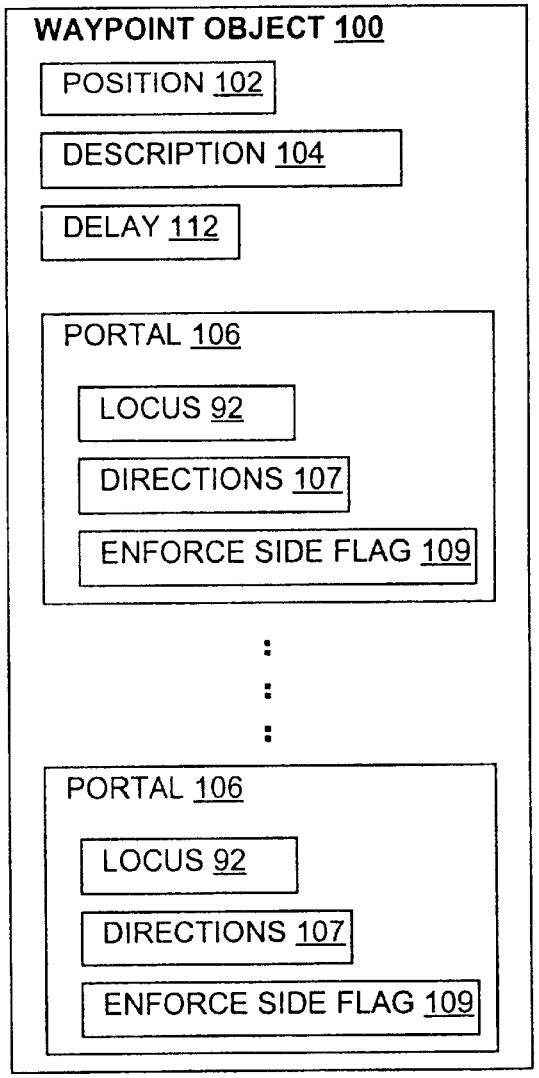
FIG. 11 is a diagram illustrating the components of the waypoint object of FIG. 4.

FIG. 11 shows the data included in a waypoint object 100. The waypoint objects 100 are formed or created by the navigation application 47 that provides the waypoint objects 100 to the route calculation tool 40. Alternatively, the waypoint objects 100 may be provided by one or more other programs or routines that are part of the navigation program 18 that create the waypoint objects 100 and provide them to the navigation application 47, which in turn provides them to the route calculation tool 40. (In an alternative embodiment, the waypoint objects 100 may be provided by a program outside of the navigation program 18 or even outside of the navigation system 10. In one present embodiment, the waypoint object is created by the navigation application, but it uses one or more functions in the route calculation tool to do it. The contents of the waypoint object may therefore be opaque to the application.)

(ii) Navigation position objects

Referring again to FIG. 4, in one embodiment, the navigation application 47 uses some or all of the information in navigation position objects 56 to create the waypoint objects 100. In one embodiment, a geocoding tool 90 creates the navigation position objects 56 which are provided to the navigation application 47. The geocoding tool 90 may create the navigation position objects 56, in part, from information 57 provided to it from the navigation application 47. For example, this information 57 may include coordinates or other information derived from input from the end-user via the user interface 31 (of FIG. 1). This input information may include, for example, a street address, a point-of-interest, crossroad, or some other location representing a desired destination, or a desired intermediate location. The geocoding tool 90 may also create a navigation position object 56 from information derived from the positioning system 14.

This information from the positioning system 14 may also be provided to the geocoding tool 90 by way of the navigation application 47 and may be used to create a navigation position object 56 that represents an origin of a route corresponding to a present position of the vehicle in which the navigation system 10 is located.

Figure 9:
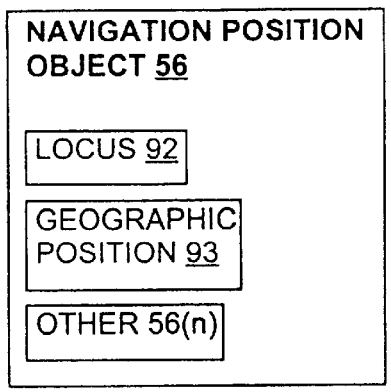
FIG. 9 is a diagram illustrating the components of the navigation position object of FIG. 4.

FIG. 9 is a diagram illustrating the structure for a navigation position object 56. Referring to FIG. 9, the navigation position object 56 is a data structure that contains information about a location in terms of data in the geographic database 40. This position may be expressed as a locus data structure 92 (described below). Alternatively, the position may be expressed in various other ways. In addition to the locus data 92, the navigation position object 56 may include geographic coordinate data 93 (e.g, latitude, longitude) associated with the locus 92. In a present embodiment, each navigation position object 56 includes only a single locus 92. The navigation position object 56 may also include other data 56(n).

(iii) The locus

Figure 10:
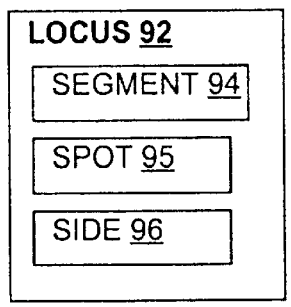
FIG. 10 is a diagram illustrating the components of the locus structure of FIG. 9.

FIG. 10 is a diagram illustrating the locus data structure 92. The locus data structure 92 identifies a position along a road segment represented by a road segment data record in the map database 30. The locus data structure 92 includes (1) data 94 identifying one road segment data record (e.g., by a segment identifier or ID) associated with the locus, (2) a spot 95 along the road segment represented by the road segment record 94 at which the locus is located, and (3) the side 96 of the road segment represented by the road segment record 94 on which the locus resides. In a present embodiment, in order to define a spot 95 along a road segment, each road segment, regardless of size, may be divided into 256 subsegments, each of which defines a position along the road segment. The information in the locus data structure 92 may be defined by the routine, such as the geocoding tool 90, that provides navigation position objects 56 to the navigation application 47 which in turn uses navigation position objects 56 to create waypoint objects 100 which are provided to the route calculation tool 40.

Referring to FIGS. 4, 9, and 10, the geocoding tool 90, or a similar program, translates origin/destination information into the locus data structure 92, or similar data structure, and provides this locus data 92 in navigation position objects 56 to the navigation application 47. The origin/destination information may be derived from input from the end-user via the user interface 31 (of FIG. 1). For example, the end-user may input a destination of "300 South Wacker Drive, Chicago Ill." The geocoding program 90, or some other program that it may utilize, determines that the specified address is located at position Y along segment X and is on the left-hand side of segment X in order to form the locus data structure. The geocoding program 90 stores this locus information 92 in a navigation position object 56 which is provided to the navigation application 47. Once the navigation application 47 receives the locus information 92 in the navigation position object 56, it uses the locus information 92 to create a waypoint object 100 which is provided to the route calculation tool 40 in order to perform a route calculation.

Origin information may also be derived from a position determined by the positioning system 14 (of FIG. 1). This information is also used to create a locus 92 which is stored in a navigation position object 56 that corresponds to the origin. This navigation position object 56 corresponding to the origin is provided to the navigation application 47 and used by the navigation application 47 to create a waypoint object 100 corresponding to the origin which is provided to the route calculation tool 40.

(In an alternative embodiment, the navigation application 47 may obtain the locus information 92 from a program and use it to form a waypoint object 100 without obtaining it in the form of a navigation position object.)

(iv) Components of the waypoint object

Figure 12:
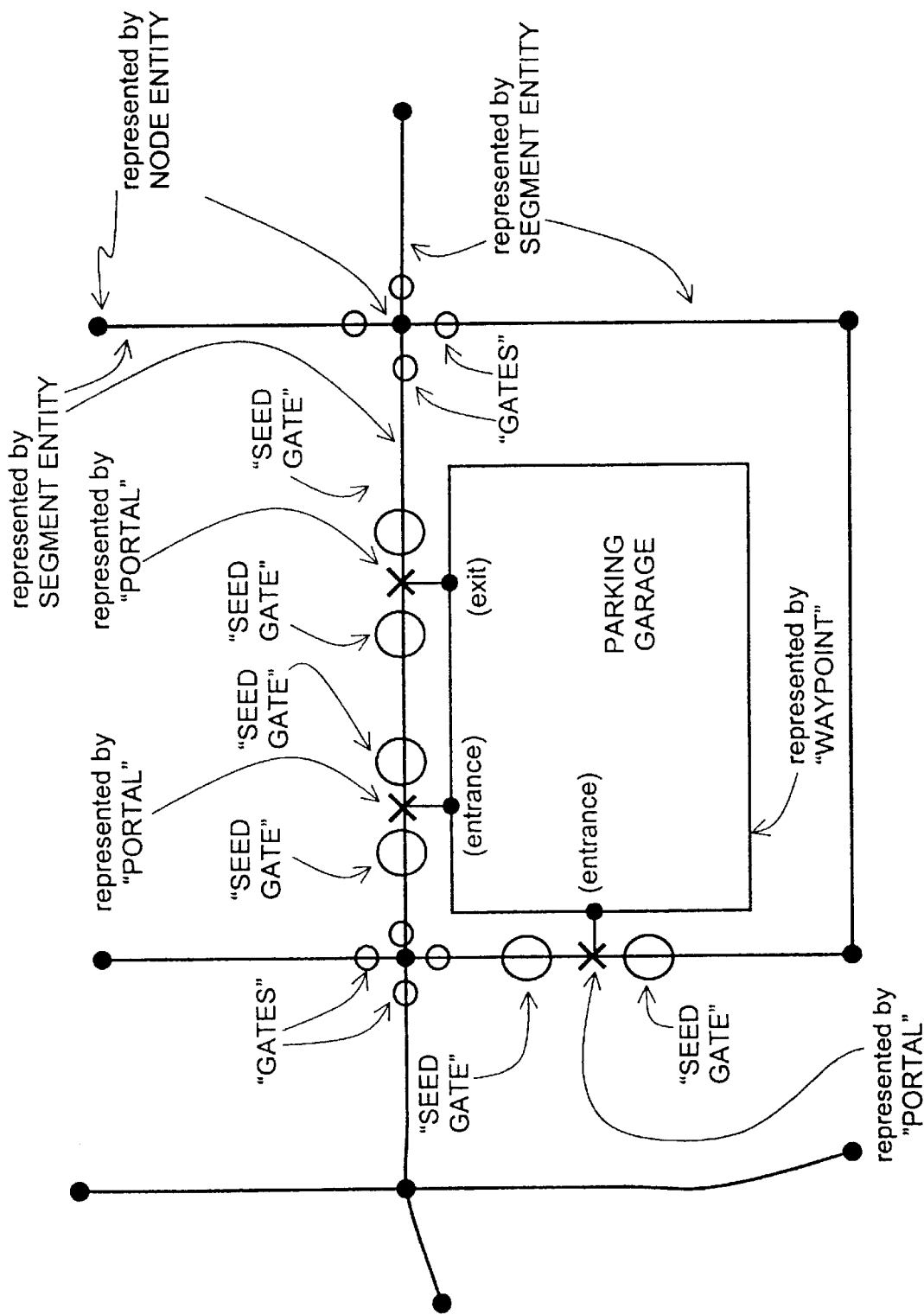
FIG. 12 is a diagram illustrating the geographic features represented by the waypoint object of FIG. 11.

FIG. 11 is a diagram illustrating the components of a waypoint object 100. FIG. 12 is a map illustrating a waypoint represented by a waypoint object. The waypoint object 100 is a data structure provided to the route calculation tool 40. As mentioned above, the waypoint object 100 represents a location through which the route to be calculated by the route calculation object 50 is constrained to pass. Waypoint objects 100 are used to represent the origin of the route, the destination of the route, and any intermediate locations along the route.

Waypoint objects may be temporary data structures, permanent structures, or semi-permanent structures. For example, permanent or semi-permanent waypoint objects may be stored in the non-volatile storage 16 (of FIG. 1) or even in the geographic database 30. The navigation system may allow an end-user to store favorite or commonly visited destinations and may provide for storage of waypoint objects 100 in the non-volatile memory 16 to represent these end-user selections. Waypoint objects may also be pre-formed and stored in the geographic database 30 for certain destinations.

Using the navigation position objects 56, as well as other information, the navigation application 47 forms at least two waypoint objects 100 which are provided to the route calculation tool 40. Referring to FIG. 11, each waypoint object 100 includes the following information (1) optionally, position data 102 of the waypoint, (2) optionally, a description 104 of the waypoint, (3) optionally, a delay 112 associated with the waypoint, and (4) one or more portals 106.

The geographical position 102 of tie waypoint object 100 is provided by the navigation application 47. The geographic coordinates 102 are the actual geographic coordinates (i.e., latitude and longitude) of the waypoint, as distinguished from the coordinates of an entrance to or exit from the waypoint or a position located along a road segment in the geographic database 30.

The description 104 of the waypoint is a name, or other textual description, by which the waypoint is commonly known. For example, the description may be "Sears Tower." The data included in the description 104 is supplied by the navigation application 47 when it forms the waypoint object 100. The description 104 of the waypoint object is an optional item of data.

The delay 112 may be associated with an waypoint object that represents an intermediate waypoint. The delay 112 represents an amount of time to be spent at or in the vicinity of the intermediate waypoint. A value for the delay is specified in an input provided from the end-user via the user-interface 31 (of FIG. 1). The navigation application 47 associates this delay value with other information that represents the intermediate waypoint to form a waypoint object that represents the intermediate waypoint. For example, an end-user may desire a route between an origin and a destination which passes through an intermediate waypoint representing a restaurant location. If the end-user plans to spend one hour at the restaurant, that hour would be the delay for the intermediate waypoint that represents the restaurant. The delay 112 of a waypoint object is an optional item of data.

(v) Portals

As illustrated in FIG. 11, each waypoint object 100 has one or more portals 106. A portal 106 is a data structure that represents one of the entrances or exits of the waypoint represented by the waypoint object 100. In some cases, a waypoint is accessible via more than one road segment in the map database 30 or by more than one position on the same road segment. For example, referring to FIG. 12, a waypoint object may be used to represent a parking garage. The parking garage is located at an intersection and has a separate entrance and exit located at different positions along a single segment of a roadway and has another entrance located along another segment. Under these circumstances, the navigation application 47 uses more than one portal 106 in forming the waypoint object 100 that represents the parking garage. Each entrance to the parking garage is represented by a portal and each exit from the parking garage is represented by a portal.

Each portal 106 in the waypoint object 100 includes a locus 92 (as described above), a direction 107, and a side flag 109. The locus 92 information included in each portal data structure 106 may be derived from a separate navigation position object 56 which is provided to the navigation application 47, as explained above. Because each waypoint may have multiple entrances and/or exits, each of which is represented by a separate portal 106, the navigation application 47 may use several navigation position objects 56 to obtain the loci 92 to form the portals 106 required for the waypoint object 100 that represents the waypoint.

As mentioned above with respect to FIG. 10, a locus data structure 92 identifies (1) a segment data record, (2) a position along the road segment represented by the road segment data record, and (3) a side of the road segment represented by the segment data record. When used in connection with a portal 106, the locus data structure 92 identifies the road segment data record that represents one of the road segments from which the waypoint represented by the waypoint object can be entered by means of the portal (if the locus represents an entrance) or from which the waypoint represented by the waypoint object can be exited by means of the portal (if the locus represents an exit). As further mentioned above, this locus data structure 92 also identifies the position along the road segment represented by the road segment record at which the access to or from the waypoint is permitted. The locus data structure 92 also identifies the side of the road segment represented by the road segment record on which the waypoint is located.

In addition to the locus data 92, the portal data structure 106 also includes direction information 107 and side flag information 109. The direction information 107 indicates a direction associated with the portal 92. The direction information 107 indicates whether the waypoint can be entered from the associated portal, exited from the associated portal, or both entered and exited. If the waypoint object represents an intermediate stop along a route, a route calculated to the waypoint will be constrained to use a portal for which the direction 107 indicates that entrance into the waypoint is permitted (or both entrance and exit is permitted). On the other hand, a route calculated from an intermediate waypoint will be constrained to use a portal for which the direction 107 indicates that exit from the waypoint is permitted (or both entrance and exit is permitted).

The enforce side information 109, if set, requires that the route begin (or end) on the side of the street specified in the locus, depending upon whether the portal is being used as an exit from or an entrance to the waypoint. When the enforce side data 109 is set, it means that the exit from (or entrance into) the waypoint represented by the portal has to made on the side of the street upon which the waypoint is located (i.e., the street cannot be crossed). The enforce side flag 109 is not used for one-way streets C. Route Calculation Object The route calculation tool 40 includes a route calculation object 50. The route calculation object 50 uses the information in two or more of the waypoint objects 100 to store data in a route object 60 which is returned to the navigation application 47, as described below. The route calculation object 50 may be provided with additional objects, including the configuration object 64, the vehicle object 68, and so on, as mentioned above.

(1). Initial formation of components of the Route Calculation Object

As mentioned above, the waypoint objects 100 provided to the route calculation tool 40 include at least two waypoint objects 100, one that represents an origin and one that represents a destination. Additional waypoint objects 100 may be provided to the route calculation tool to represent intermediate stops that the end-user desires to make along the way between the origin and the destination.

Prior to performing route calculation, each route calculation object 50 creates several new data structures. These data structures are internal to each route calculation object 50 and therefore are not necessarily shared between them. These data structures created by each route calculation may be temporary data structures or may be permanent or semi-permanent data structures. These data structures are created, manipulated, modified, and may be destroyed during operation of the route calculation tool 40. For purposes of creating, modifying, manipulating, and destroying these data structures, appropriate programming, such as a route calculation engine 160, may be provided. The presence and operation of the route calculation engine 160 is internal to the route calculation object 50 and therefore is opaque to the navigation application 47.

Figure 13:
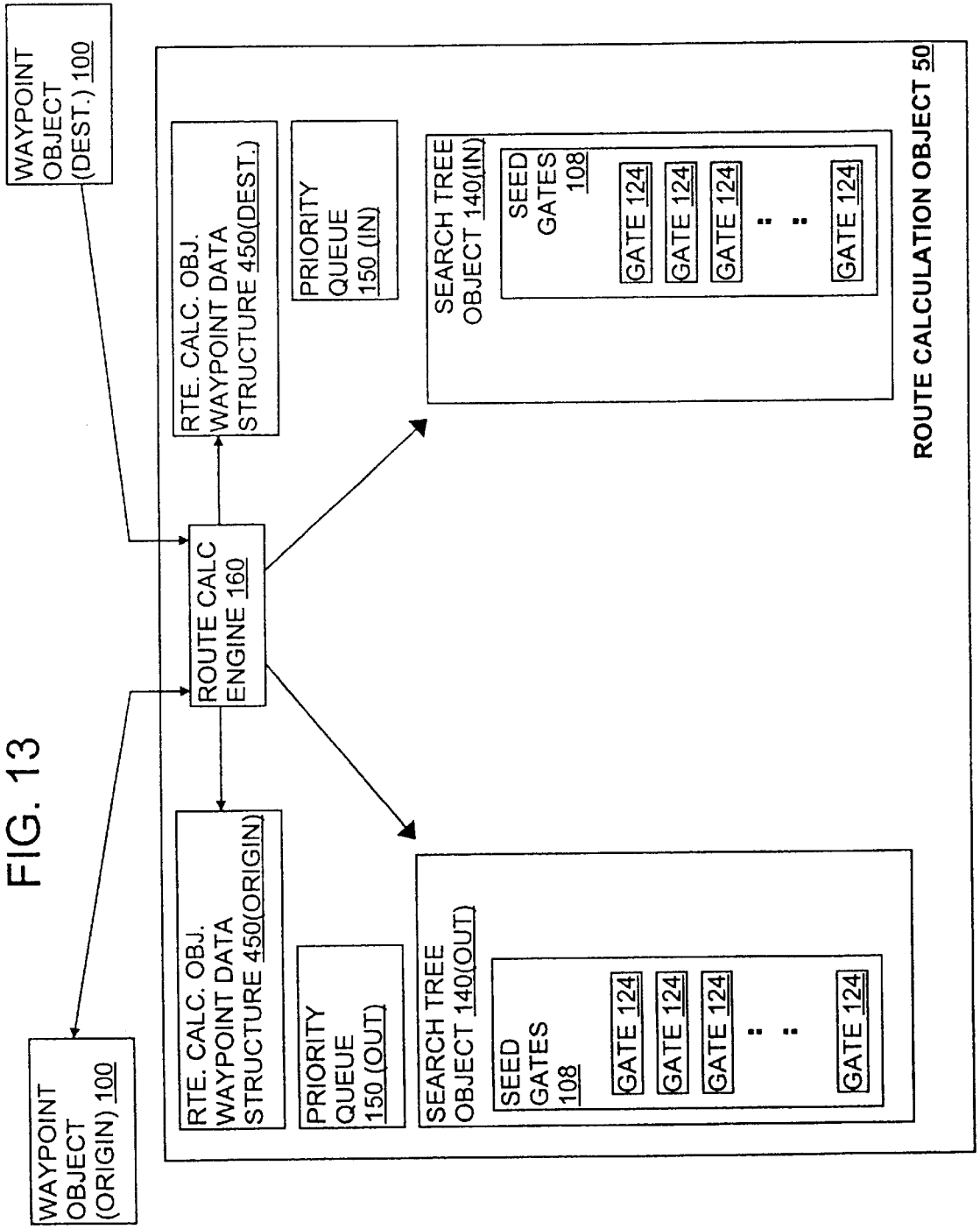
FIG. 13 is a diagram of the components in the route calculation object of FIG. 4 in one stage of operation.

Referring to FIG. 13, included among the data structures created by the route calculation object 50 are route calculation object waypoint structures 450, search tree objects 140, and priority queue objects 150. Component parts of these objects, such as gates 124, are also created by the route calculation object 50.

Figure 20:
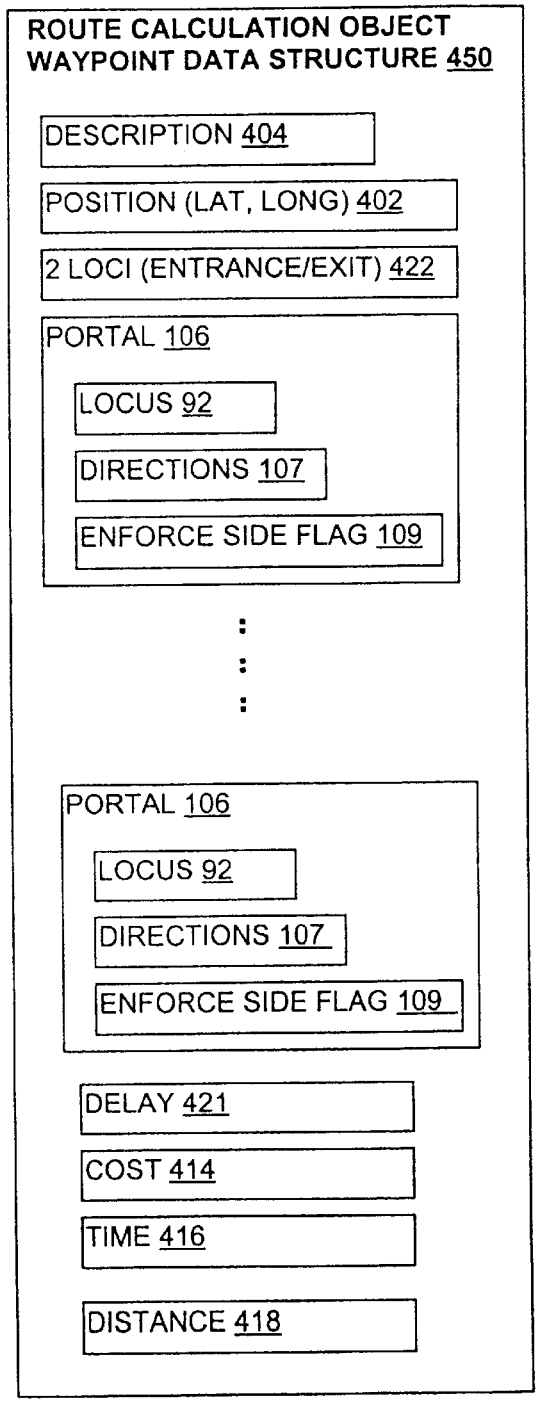
FIG. 20 is a diagram illustrating the components of the waypoint data structure which is used in route calculation object of FIGS. 13–15.

A route calculation object waypoint data structure 450 is created for each waypoint object 100 provided to the route calculation object 50. In FIG. 13, a route calculation object waypoint data structure 450(ORIGIN) is created for the origin waypoint and a route calculation object waypoint data structure 450(DEST) is created for the destination waypoint. The data included in each route calculation object waypoint data structure 450 is shown in FIG. 20. Some of the data included in the route calculation object waypoint data structure 450 is derived from the corresponding waypoint object 100 provided to the route calculation object 50. The description 404 in the route calculation object waypoint data structure 450 corresponds to the description 104 included in the waypoint object 100 for the corresponding origin, destination, or other waypoint. Likewise, the position 402 included in the route calculation object waypoint data structure 450 corresponds to the position 102 in the waypoint object 100 for the corresponding origin, destination, or other waypoint.

For each route calculation waypoint data structure 450 in the route calculation object 50, except the route calculation object waypoint data structure 450(ORIGIN) that represents the origin, the time of travel 416, the distance 418, and the cost 414 hold values that are developed as part of the process of route calculation.

The time of travel 416 holds a value that indicates the cumulative total time to travel a route from the origin waypoint to the waypoint represented by the route calculation object waypoint data structure 450. This value 416 is determined by adding the times of travel of the road segments that comprise a solution route from the origin waypoint to the waypoint represented by the route calculation object waypoint data structure 450. Alternatively, the time of travel 416 may include the travel times for traversing both segments and nodes.

The distance of travel 418 holds a value that indicates the cumulative total distance to travel a route from the origin waypoint to the waypoint represented by the route calculation object waypoint data structure 450. This value 418 is determined by adding the distances of the road segments that comprise a solution route from the origin waypoint to the waypoint represented by the route calculation object waypoint data structure 450.

The cost of travel 414 holds a value that indicates the cumulative total cost to travel a route from the origin waypoint to the waypoint represented by the route calculation object waypoint data structure 450. The cost 114 refers to that measurable quantity that is being minimized during a search relative to the origin waypoint. The navigation application 47 provides the item to be used for the cost to the route calculation object (e.g., in the configuration object). The cost may be configurable by the end-user. For example, the end-user may desire to find the quickest route, and therefore time is the cost item being minimized. If the end-user desires the shortest route, distance is the cost item being minimized. Other kinds of cost items may be selected, including custom cost functions that incorporate combinations of various factors. Other cost values that can be minimized include items such as minimizing U-turns and avoiding highways. This cost value 414 is developed as the route is being calculated by adding the costs of the road segments that are added to a solution route from the origin waypoint to the waypoint represented by the route calculation object waypoint data structure 450.

In the route calculation object waypoint data structure 450(ORIGIN) corresponding to the origin waypoint, the time 416, distance 418, and cost 414 are zero.

If a waypoint object 100 provided to the route calculation tool 40 includes a delay 112, the route calculation object waypoint data structure 450 formed from the waypoint object 100 also includes a delay 421 which corresponds to the delay of the waypoint object 100.

Each route calculation object waypoint data structure 450 also includes the portal data 106 from the corresponding waypoint object 100.

Before the route calculation tool 40 begins to calculate a route, the sequence in which the intermediate waypoints are visited may be reordered. According to one embodiment, if the navigation application 47 requests that the route calculation tool 40 reorder the intermediate waypoints (via a function call or other appropriate means), the intermediate waypoints are reordered based upon distance from the origin. Alternatively, the navigation application may provide an alternative reordering algorithm, function or ordering to use for reordering. If no instructions regarding reordering are provided by the navigation application 47 to the route calculation tool 40, the route calculation tool 40 begins to calculate a solution route that visits the intermediate waypoints in the order in which they are provided to the route calculation tool 40.

(2). Initial formation of the Search Tree Objects

Referring again to FIG. 13, to perform route searching, the route calculation object 50 creates and uses at least two search tree objects 140. The two search trees objects include an outbound search tree object 140(OUT) and an inbound search tree object 140(IN).

The search tree objects 140 are parts of the route calculation object 50. The search tree objects 140 are used internally by the route calculation object 50 and thus are transparent to the remainder of the route calculation tool 40. Each search tree object 140 defines and holds information used for route searching. Specifically, each search tree object 140 holds a search tree 141 (shown in FIGS. 15 and 16) formed of gates 124 associated with a respective one of the waypoints. When calculating a route between an origin waypoint and a destination waypoint without any intermediate stops, the outbound search tree 141(OUT) is associated with the origin waypoint and the inbound search tree 141(IN) is associated with the destination waypoint. However, if there are intermediate waypoint stops, multiple inbound and outbound search tree pairs are created and used successively by the route calculation object 50, one pair for each leg of the route. For example, if there is one intermediate waypoint, a first outbound search tree 141(OUT) is used for the origin waypoint and a first inbound search tree 141(IN) is used for the intermediate stop waypoint. After a route between the origin and the intermediate waypoint stop is calculated, the route calculation object 50 creates two new search trees. A second outbound search tree 141(OUT) is used for the intermediate waypoint and a second inbound search tree 141(IN) is used for the destination waypoint. Additional search tree pairs may be formed and used if there is more than one intermediate stop. (As explained further below, for certain kinds of searches each search tree object may be associated with more than one waypoint.)

During route calculation, the search tree 141 in each search tree object 140 is grown. The search tree 141 is grown by expanding gates 124. Gates 124 are data structures that define both a position and a direction along a path, as explained below. When a gate 124 is expanded, its one or more successor gates 124 are identified and added to its respective search tree, thereby growing the tree. Each search tree 141 is grown toward a single point. This single point towards which the search tree grows is referred to as a focus 143. Each search tree object 140 has only a single focus 143. However, in a present embodiment, the focus 143 of a search tree object 140 is configurable, and thus may be chosen to be any point. For example, in a present embodiment, the focus 143(OUT) of the outbound search tree 141(OUT) may be selected to coincide with the position of the waypoint associated with the inbound search tree. This point may be the destination waypoint or an intermediate waypoint. Alternatively, the focus 143(OUT) of the outbound search tree 141 (OUT) may be selected to coincide with a point on the inbound search tree 141(IN). If the inbound search tree 141(IN) has already been grown, it is preferred to select a point on the inbound search tree 141(IN), such as the point that is closest to the origin waypoint, as the focus of the outbound search tree 141(OUT). Alternatively, the focus 143(OUT) of the outbound search tree 141(OUT) can be selected to coincide with any other suitable point., or another point determined to optimize the direction of growth of the search tree.

Similarly, the focus 143(IN) of the inbound search tree 141(IN) may be selected to coincide with the waypoint associated with the outbound search tree. This waypoint may be the origin waypoint or an intermediate waypoint. Alternatively, the focus 143(IN) may be selected to be any point on the outbound search tree 141(OUT). In other alternatives, the focus 143(IN) of the inbound search tree 141(IN) can be selected to coincide with any other suitable point determined to optimize the direction of growth of the search tree, as well as the vehicle position (as explained below with respect to rerouting).

(3). Formation of gates in general

As mentioned above, each of the search trees 141 is formed of one or more gates 124. All the gates in each search tree 141, except for the initial (or seed) gates, are formed by expanding gates to find successor gates which are added to the search tree 141 thereby growing it. The initial gates 124 in each search tree 141 are seed gates 108. During route calculation, the search tree 141 grows from these seed gates 108 (i.e., the "roots" of the search tree 141) toward the single focus point 143 associated with the respective search tree object 140.

Figure 17:
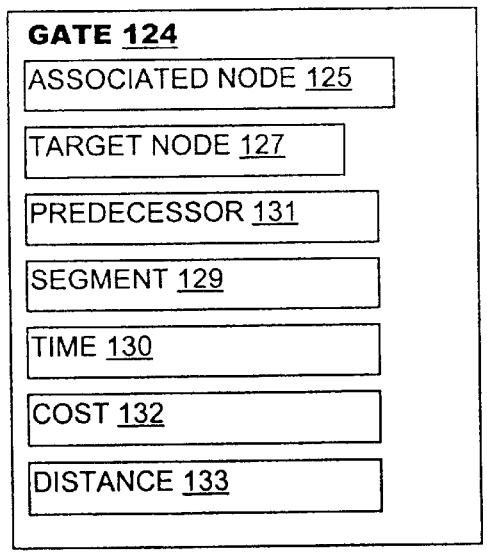
FIG. 17 is a diagram illustrating the components of the gate data structure of FIGS. 13–15.

Referring to FIG. 17, there is a diagram representing the data structure of a gate 124. Each gate 124 includes data which define both a position and a direction along a path. To define a position, each gate 124 includes (or refers to) an item of data 125 that defines a position in the geographic database. If the gate 124 is other-than-a-seed-gate, this item of data 125 is a node data record (in FIG. 2) in the geographic database 30. If the gate 124 is other-than-a-seed-gate, the node data record in this item of data 125 is referred to as the associated node of the gate. The position of the gate 124 corresponds to the position of its associated node.

To define a direction along a path, each gate 124 includes (or refers to) another node data record 127. This node record included in this item of data 127 is referred to as the target node of the gate. If the gate is other-than-a-seed-gate, the target node 127 represents one of the endpoints of a road segment represented by a segment data record whose other endpoint is represented by the node data record corresponding to the associated node 125. Accordingly, a gate 124 (other-than-a-seed-gate) defines a position by means of a node and a direction from that position by means of another node located at the other end of a segment that links the two nodes. Thus, the gate 124 defines both a position (by means of the item of data 125) and a navigable direction from the position (via the road segment represented by the segment record whose endpoint corresponds to the target node which is accessible) toward the target node 127.

In addition to a position and a direction, each gate 124 identifies a path in the direction from the position. To identify this path, the gate 124 identifies a road segment record that links its associated node and its target node. The gate data structure 124 includes an item of data 129 identifying this segment data record. This identification 129 of the segment may include a segment database ID, a pointer to a segment database ID, or other appropriate reference.

In forming gates, the routing attributes associated with the nodes and segments are examined to ascertain that travel in the desired direction between the two nodes via the segment that links them is permitted before a gate is formed. For example, with respect to the gates in the outbound search tree, the target node is required to be accessible from the associated node via the segment that links them. In the outbound tree, if a road segment is a one-way street directed toward a first node from a second node, the second node is not accessible from the first node via this segment, and therefore a gate cannot be formed linking these two nodes in this direction via this segment.

On the other hand in the inbound search tree, the segments and nodes are evaluated for valid travel in the opposite (i.e., reverse) direction. With respect to the gates in the inbound tree, the associated node is required to be accessible in a direction back from the target node via the segment that links them. For example, in the inbound search tree if a first end of a road segment is being evaluated as a potential associated node and the road segment is a one-way street directed toward the node at the other end of the segment, the segment is not accessible (in this direction) and therefore a gate is not formed linking these two nodes in the inbound search tree. (For purposes of this disclosure, accessibility of the target node relative to the associated node is understood to take into account the opposite directions of travel of the outbound search tree and the inbound search tree.)

If the gate is other-than-a-seed-gate, it also includes a reference 131 to its predecessor gate. This reference 131 may be pointer, or other suitable data referencing structure. The reference 131 in each gate can be used to reconstruct the route from a seed gate to any successor gate, and vice versa.

(4). Seed gates

Gates 124 used as seed gates 108 have a similar structure as gates used as other-than-seed-gates. When a gate is used as a seed gate, some of the data included in it represent different features compared to when a gate is used other-than-as-a-seed gate.

When a gate is used as a seed gate, it defines a location into (or out of) an associated waypoint. Referring to FIG. 13, the information used to form the seed gates for each search tree 140 is derived from the corresponding waypoint object 100 provided to the route calculation object 50. When the route calculation object 50 is provided with at least two waypoint objects 100, one for the origin and one for the destination, it uses the information in these waypoint objects 100, specifically the portal information, to form seed gates for the outbound search tree and the inbound search tree, respectively. These seed gates are added to the appropriate search trees. Thus, in forming the seed gates for the outbound search tree object 140(OUT), the data in the waypoint object 100(ORIGIN) that represents the waypoint of the origin is used to form seed gates 108 that are added to the outbound search tree 141 in the outbound search tree object 140(OUT) in FIG. 13. Likewise, in forming the seed gates for the inbound search tree object 140(IN), the data in the waypoint object 100(DEST) that represents the waypoint of the destination is used to form seed gates 108 that are added to the inbound search tree 141 in the inbound search tree object 140(IN) in FIG. 13.

Figure 18:
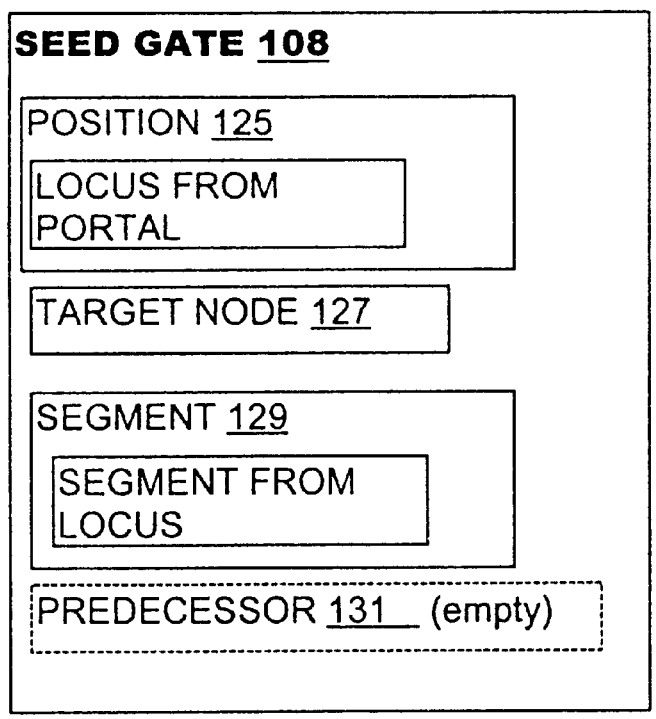
FIG. 18 is a diagram illustrating the components of the gate data structure of FIG. 17 when used as a seed gate.
Figure 19:
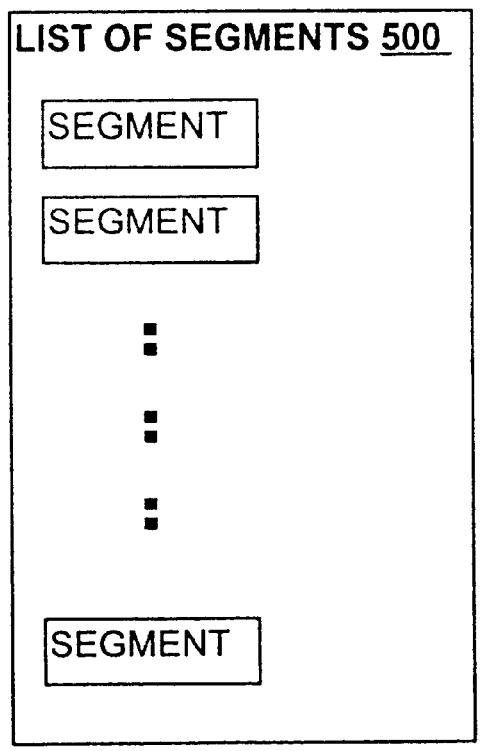
FIG. 19 is a diagram illustrating the list of solution routes in FIG. 15.

FIG. 18 shows the data structure of a gate 124 used as a seed gate 108. If the gate 124 is used as a seed gate, the item of data 125 that represents the position of the gate corresponds to one of the portals 106 from the waypoint object 100. In each seed gate 108, the item of data 125 corresponding to the position of the gate is the locus of one of the portals 106 of the associated waypoint object. As mentioned above, a portal 106 represents an entrance to the waypoint represented by the waypoint object, an exit from the waypoint represented by the waypoint object, or both. Each portal of a waypoint object 100 is used to form one or two seed gates in its respective search tree object 140.

Each seed gate also includes a target node 127 which is used to define a direction. The target node 127 defines a direction into or out of the location represented by the locus 92 included in the item of data 125 corresponding to the position of the seed gate. The node data record in the target node 127 represents the road segment endpoint that can be accessed (in a forward direction for the outbound search tree and in the opposite direction for the inbound search tree) from the location represented by the portal of the waypoint. Thus, the seed gate defines a direction from the geographic position represented by the locus 92 of a portal of a waypoint towards a node at one end of the segment on which the portal lies, thereby linking the portal to the end node of the segment and thereby to the rest of the road network in the geographic region. The segment 129 of the seed gate 108 corresponds to the segment upon which the locus 92 of the portal 106 is located. Since a seed gate has no predecessor, it does not point to a predecessor and accordingly has no data corresponding to the predecessor pointer 131.

As mentioned above, a portal 106 includes a locus 92 which defines a spot 95 along a road segment 94. In forming seed gates, if travel from the portal 106 is permissible along its associated segment in both directions, the portal 106 may be used to form two seed gates 108. One seed gate would have as its target node the node at one end of the segment associated with the locus, and the other seed gate would have as its target node the node at other end of the segment associated with the locus. If travel from the portal 106 is permitted in only one direction, the portal 106 may be used to form only one seed gate 108.

(5). Initial check for solution route

At this stage, before either search tree is grown, the inbound search tree 141(IN) and the outbound search tree 141(OUT) are checked to see whether a solution route exists between the origin and destination waypoints. A solution route exists when a seed gate in one search tree corresponds to a seed gate (and thus the same segment) in the other search tree. After forming all the seed gates in one of the search trees, as each seed gate is formed in the other search tree, its segment ID (i.e., in data item 129) is compared to the segment ID in all the gates in the opposite tree whose associated nodes are the same as the target node of the new gate. (Gates are stored in lists indexed by the node ID of the associated node to facilitate this check). If a match is found, it is an indication of a complete path from origin to destination and a potential solution. If a solution route is found without expanding any of the seed gates, the solution route between the origin waypoint and the destination waypoint comprises a single road segment record. If a solution route is found at this stage, the destination is 'just down the block' from the origin. The solution route, consisting of a single segment record, is placed into a list of potential solution routes 500 (in FIG. 15). Assuming all criteria for further searching have been met, the potential solution route from the list 500 is stored in an output route object 60. This route output object 60 is provided to the navigation application 47 which in turn may provide it to another program (such as a maneuver generation program) in the navigation application program 18 from which instructions are provided to the end-user via the user interface.

(6). Initial expansion of gates

Figure 14:
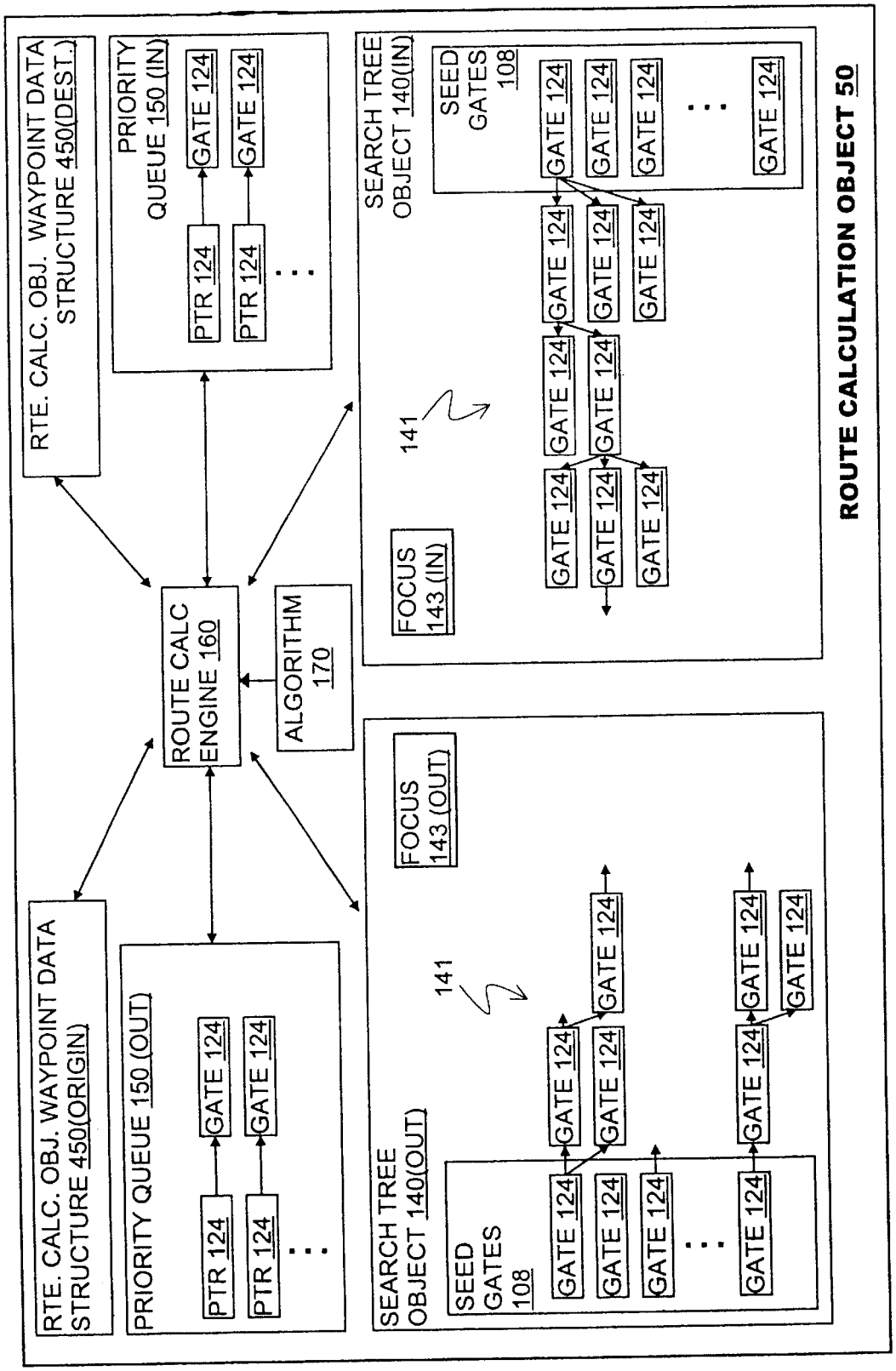
FIG. 14 is a diagram of the components in the route calculation object of FIG. 4 in another stage of operation.

If a solution route is not found after all the seed gates are formed and added to their respective search trees, each of the seed gates is expanded thereby growing the search trees. Because the search trees initially include only seed gates, these gates are expanded first. A seed gate is expanded by forming its successor gates and adding these successor gates to its respective search tree. Referring to FIG. 14, starting with the seed gates 108, each search tree is grown by creating successor gates 124. The associated node of a successor gate is the same node as the target node of the gate which the successor gate succeeds. The successor gates 124 of the seed gates 108 are formed using the target nodes of the seed gates 108. Like the seed gates 108, these successor gates 124 are defined and used by the route calculation object 50 during route calculation. Like the seed gates, these successor gates 124 allow the route calculation tool 40 to define both a position and a direction.

Where a target node of a gate (seed or other-than-seed) represents an endpoint of multiple segments which can be accessed through that node, the gate will have multiple successor gates, one for each segment. Where a target node of a gate represents an endpoint of only one segment which can be accessed through that node (taking into account the forward and backward directions of the outbound and inbound trees, respectively), the gate will have only one successor gate. Where no segment can be accessed through the node represented by the target node of a gate, the gate with have no successor gates.

In both the outbound search tree 141(OUT) and the inbound search tree 141(IN), the successor gates of the seed gates are determined and added to their respective search trees. At this stage, the inbound search tree 141(IN) includes the seed gates 108 from the destination waypoint and the immediate successor gates 124 of these seed gates 108. The outbound search tree 141(OUT) contains the seed gates 108 of the origin waypoint and the immediate successor gates 124 of these seed gates 108. In the search tree objects of FIG. 14, each gate 124 is stored with its respective associated node.

At this stage, as the inbound search tree 141(IN) and the outbound search tree 141(OUT) are grown by determining the successor gates of the seed gates, as each successor gate is formed, it is checked to see whether a solution route exists between the origin and destination waypoints. As mentioned above, a solution route exists when a gate in one search tree corresponds to a gate (and thus the same segment) in the other search tree. As each successor gate of the seed gates is formed, its segment ID is compared to the segment ID's of all the gates in the opposite tree whose associated nodes are the same as the target node of the new gate. If a match is found, it is an indication of a potential solution. If a solution route is found, the solution route, consisting of the segment records in each search tree that meet at the matching gate, is placed into the list of potential solution routes 500 (in FIG. 15). Unless applicable search configuration criteria require that searching be continued for additional solution routes, the potential solution route is stored in the output route object 60.

(In an alternative embodiment, as each of the seed gates associated with the origin is added to the outbound search tree, it is expanded to form several successors which are also added to the outbound tree. This is done to move the outermost gates of the outbound search tree away from the origin waypoint and out of a possibly restricted traffic area that may not be easily accessed by growth of the inbound search tree. Some areas include traffic restrictions in which the accessibility of a road segment depends upon the characteristics of a preceding segment. Areas that prohibit through traffic are examples of these kinds of traffic restricted areas. If the origin waypoint is in such an area, a route can be calculated away from it, but not necessarily into it, since road segments in these traffic restricted areas are not necessarily available when searching is being done for the inbound search tree.)

(7). Initial formation of the Priority Queue Objects

Referring again to FIG. 13, when performing route searching, the route calculation object 50 creates and uses two priority queue objects 150. In a preferred embodiment, each search tree object 140 is associated with a priority queue object 150. The priority queue objects include an outbound priority queue object 150(OUT) associated with the outbound search tree object 140(OUT) and an inbound priority queue object 150(IN) associated with the inbound search tree object 140(IN).

Like the search tree objects 140, the priority queue objects 150 are parts of, and are used internally by, the route calculation object 50. Thus, they are transparent to the remainder of the route calculation tool 40. Each priority queue object 150 contains a list that assigns a priority value to each unexpanded gate in its respective search tree object. The priority values are used to determine which gates in the respective search tree object are to be expanded during route calculation. (FIG. 13 represents an initial stage of the operation of the route calculation object 50 after the seed gates have been formed and added to each search tree object, but prior to assigning a priority of any of the gates in the priority queue objects 150.)

(8). Use of priority queue objects

If a solution route is not found after all the successor gates of the seed gates are formed and added to their respective search trees, one of the search trees is grown by expanding one of its gates, after which a check is made to determine whether one of the successor gates formed by expanding the gate matches one of the gates in the other search tree. In a present embodiment, the inbound search tree 141(IN) is grown first, although in an alternative embodiment, the outbound search tree 141(OUT) is grown first.

The search tree to be grown first may have a plurality of successor gates of its one or more seed gates. Although it is possible to expand each successor gate to find a solution route, such an approach would waste considerable computing resources and likely generate many unusable routes. In a present embodiment, it is preferred to expand one gate at a time and to select the gate to be expanded based upon a definable criteria. In a present embodiment, the route calculation object 50 uses the priority queue objects 150(IN) and 150(OUT) for the purpose of determining which gate to expand in each respective search tree object 140. Each priority queue object 150 contains a pointer or other means of reference to each gate in its respective search tree which has not yet been expanded. Thus, when the priority queue object 150(IN) is formed for the inbound search tree 141 (IN), pointers (or other suitable references) to the successor gates 124 formed from the seed gates 108 of the destination waypoint are stored in the priority queue object 150(IN) associated with the inbound search tree 141(IN). (The priority queue 150 contains a reference or pointer to each gate that has not yet been expanded. The gates themselves are contained in the search tree. Unexpanded gates in the search tree are also referred to as "raw gates.")

Referring to FIG. 14, in the inbound priority queue object 150(IN), an order of priority is assigned to these raw successor gates 124 using a search algorithm 170. Any known method or algorithm 170 may be used for this purpose. For example, the method used may be the A* algorithm or the Dykstra algorithm. To use the A* algorithm, the route calculation object 50 calls the algorithm 170 with a pointer to the data in each of the gates which are referenced in the priority queue 150. The route calculation engine 160 may also pass the focus or a pointer to the focus to the algorithm 170. The algorithm evaluates each of the gates referenced in the priority queue relative to the focus 143 (IN). An advantage provided by this approach is that the method used for route searching is configurable. For example, the A* algorithm may be modified to the Dykstra algorithm by setting the heuristic variable to zero. A default algorithm may be provided with the route calculation tool 40. The navigation application 47 can provide an algorithm in substitution of the default algorithm. Alternatively, other route searching techniques or algorithms may be substituted. For example, when the A* algorithm is used, the highest priority gate is the one with the lowest overall combined actual and heuristic costs. Using the algorithm 170, a weighting is assigned to each of the unexpanded gates referenced in the priority queue 150(IN).

Using the priorities assigned to the listing of gates in the priority queue 150(IN), the gate 124 in the inbound search tree 141 with the highest priority identified in the priority queue 150(IN) is expanded. This expanding may be done by the route calculation engine 160 or by any other suitable programming associated with the route calculation object 50. The route calculation engine 160 creates the successor gates of the gate being expanded and adds these successor gates to the inbound search tree 141(N). The process of creating successor gates includes the step of querying the map database 30 (represented in FIGS. 1 and 2) to find each segment data record that has the target node of the gate being expanded as one of its endpoints. Once all these road segment data records are obtained, they are examined to ascertain which, if any, of them can be used to form valid successor gates. Starting from the target node of the gate with the highest priority, each segment that connects to that node is examined to determine whether access is permitted from the segment across the target node into the segment associated with the gate being expanded. A turn restriction at the target node may prohibit access from the segment associated to the potential successor gate into the segment associated with the gate being expanded, and therefore a successor gate cannot be formed using that segment. Likewise, a one way street restriction along the segment associated with the potential successor gate may prohibit access along that segment in a desired direction, and therefore a successor gate cannot be formed using that segment.

Note that in the inbound search tree, the direction of travel is toward the target node of the gate being expanded. Therefore, the segment associated with the gate being expanded is required to be accessible from the segment associated with the potential successor gate across the target node associated with the gate being expanded. In the outbound search tree, the direction of travel is opposite. In the outbound search tree, the direction of travel is away from the target node of the gate being expanded and therefore, the segment associated with the potential successor gate is required to be accessible from the segment associated with the gate being expanded across the target node associated with the gate being expanded.

Time restrictions may also be taken into account when determining valid successor gates. As mentioned above, the end-user may specify a start time for the route. This start time is provided to the route calculation object via the time object 69. If a start time is provided, restrictions based on the estimated time of arrival at a gate are taken into account. In a preferred embodiment, if the end-user has not specified a start time for the route, all time-based restrictions may be assumed to be in effect since the route calculation tool 40 does not necessarily assume that the end-user intends to start the route at the present time. Thus, if a left turn is prohibited at an intersection between 3 P.M. and 6 P.M., the restriction will be treated as in effect if the end-user has not specified a start time.

If the gate having the highest priority (from the priority queue 150(IN)) has no valid successor gates, the gate with the next highest priority in the priority queue 150(IN) is selected and expanded, if possible.

In a present embodiment, the inbound search tree 141(IN) is grown first (until some predetermined threshold is met, such as distance traveled toward the focus), and then the outbound search tree 141(OUT) is grown. In an alternative embodiment, the outbound search tree 141(OUT) is grown first and then the inbound search tree 141(IN) is grown. In further alternative embodiments, one of the search trees is not grown at all and only the other search tree is grown until a solution route is found.

The inbound search tree 140(IN) is grown from the destination towards the focus 143(IN), which may be the position of the origin or another point. The outbound search tree 140(OUT) is grown from the origin towards a focus 143(OUT), which may be the position of the destination or another point.

As each valid successor gate is formed, it is added to its respective search tree. Thus, when a gate in the inbound search is being expanded, each of its successor gates is added to the inbound search tree 141(IN), and when a gate in the outbound search is being expanded, each of its successor gates is added to the outbound search tree 141 (OUT). As each successor gate is added to its respective search tree, it is checked to see whether the segment associated therewith (i.e., the segment 129) is already present in either of the search trees. If a successor gate of a gate being expanded is present in the other search tree, at least one solution route has been found.

Under some circumstances, a new successor gate may correspond to a gate which already exists in the same search tree that contains the gate being expanded. This can occur if a gate can be accessed by more than one route through the road network. If the new successor gate already exists in the search tree, then the actual cost 132 in the gate structure 124 (in FIG. 17) of the path leading to the existing gate is compared to the actual cost of following the new path leading to the gate, and the lower cost path is selected. Where the old path has the lower cost, then it is checked to see whether the new path has any more valid successor gates and, if not, the new path is closed. Where the new path has the lower cost, then it is checked to see whether the old path has any more valid successor gates and, if not, the old path is closed. If the old path does have valid successors, then their pointers are changed to point to the new raw gate as their parent, and the cost of the new path is propagated to the successor gates as well as to any further successor gates through such successor gates.

If all the successor gates of a gate being expanded are not already in either search tree, the successor gates are all added to the inbound search tree 141. For each new successor gate 124 that is added to the search tree 140(IN), a pointer or reference to the new gate is added to the priority queue 150(IN) for the inbound search tree 140(IN). The pointer (or other reference) to the now expanded gate is taken out of the priority queue 150(IN). (A gate that has been expanded may be referred to as an "open gate.") After the pointer to the expanded gate is removed from the priority queue 150(IN) and the pointers to the new raw gates are added to the priority queue 150(IN), the algorithm 170 is used to determine which of the unexpanded gates identified in the priority queue has the highest priority. This gate is selected for expansion and the process continues, as described above.

The inbound search tree 140(IN) is grown until either a predefined threshold is reached or a solution route is found. Upon reaching the predefined threshold, growth of the inbound search tree 141(IN) is stopped and the outbound search tree 141(OUT) is grown until a solution route is found or another predefined threshold applicable to the outbound search tree 141(OUT) is reached. In a preferred embodiment, these thresholds are preferably configurable by the navigation application 47. Threshold parameters may be stored in the configuration object 64 (in FIG. 4) which is provided to the route calculation object 50. The threshold parameter for the inbound search tree may be defined as a predefined distance from the destination waypoint, a number of search iterations, the travel time from the destination waypoint, the number of gates, the cost from the destination waypoint, or some other definable value.

If the inbound search tree 141(IN) reaches its predefined threshold before a solution route is found, the outbound search tree 141(OUT) is grown. The outbound search tree 141(OUT) is grown in a manner similar to the inbound search tree 141(IN) until a route solution is determined or until a predetermined threshold configured for the outbound tree is reached. In a preferred embodiment, each tree is grown only once. If a solution route is not found when the outbound tree is grown to its predefined threshold, a failure condition is returned indicating that a solution route has not been found within the predetermined constraints. The end-user may be given an opportunity to have the navigation system continue searching, whereupon the route calculation object is instructed by the navigation application 47 to continue growing either or both search trees. In an alternative embodiment, growth of the search trees may continue to alternate until a solution route is found.

(9). Finding of solution routes

Growth of either of the search trees 141 may be stopped prior to reaching the predetermined threshold if a solution route is found. A solution route is found when one search tree meets the other search tree. Specifically, a solution route is found when a raw (unexpanded) gate in the search tree being grown corresponds to a gate (and thus the same segment) in the other search tree. This is graphically illustrated in FIG. 15. Note that if the inbound search tree 141(IN) is not configured to have a threshold, it will continue to be grown until it meets a successor gate of a seed gate of the origin waypoint in the outbound search tree 141(OUT). If the inbound search tree 141(IN) is not configured to have a threshold, the search proceeds in a one-ended manner from the destination towards the origin. The origin waypoint seed gates and their successors are present in the outbound search tree 141(OUT), even if the inbound search tree 141(IN) has no threshold. Thus, a potential solution route is found by detecting when the two search trees meet.

After a potential solution route is found, route searching may be continued to find additional solution routes between the two waypoints until a termination criterion is met. The termination criterion can be some combination of number of potential solutions, quality (cost) of the solutions, time elapsed in the search, etc. A present embodiment finds one solution, then expands all the gates in the priority queue, without adding any new gates to the priority queue. This may produce additional solution candidates. The termination criterion may be stored in the configuration object 64 of FIG. 4.

Figure 15:
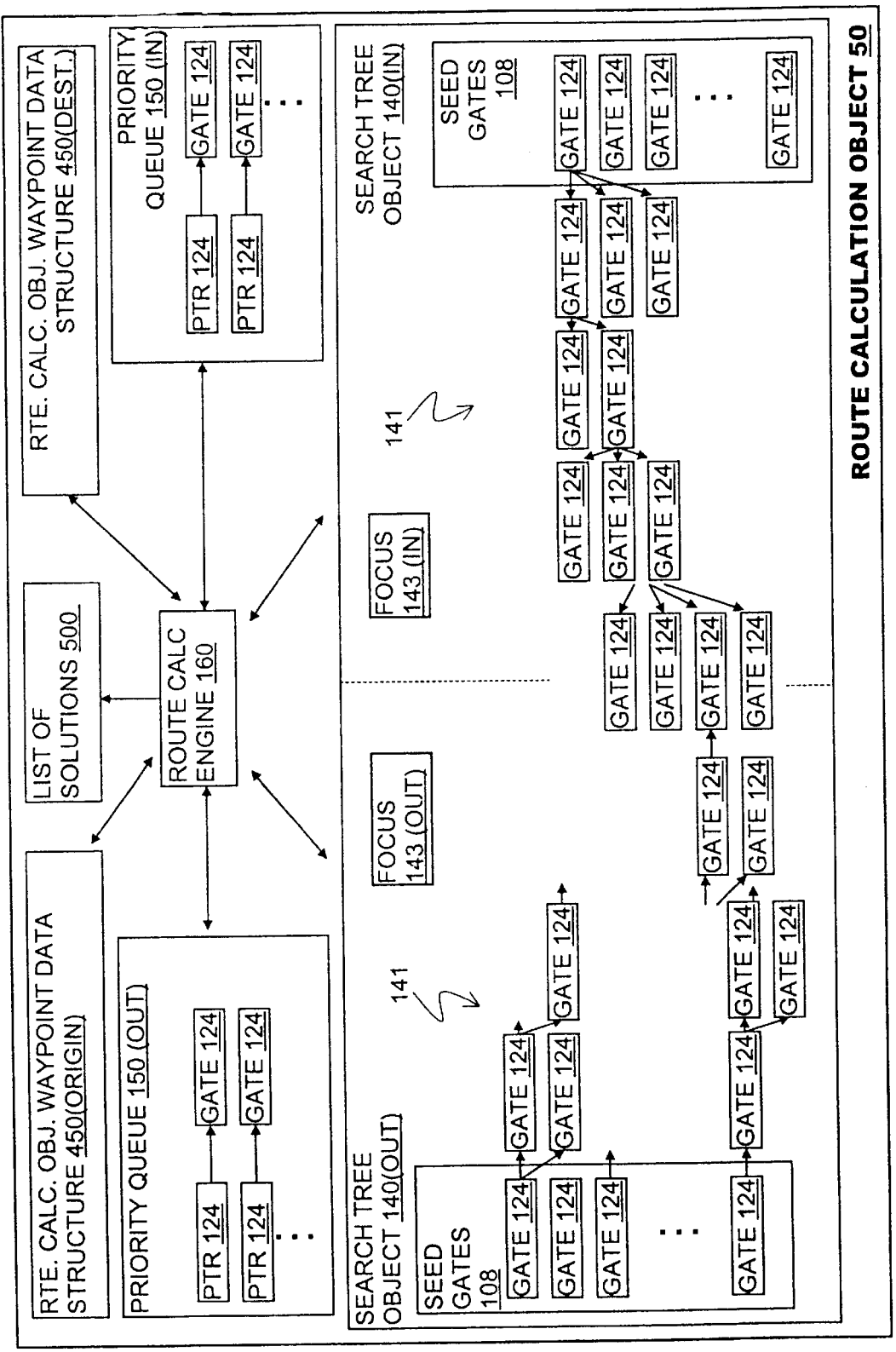
FIG. 15 is a diagram of the components in the route calculation object of FIG. 4 in yet another stage of operation.

Each new solution is placed in the list of potential solutions 500 (in FIG. 15). When the search termination criterion is satisfied, the best solution is copied to the output route object 60. All segment records from both search trees that lie along the route to the common gate are stored in the route object 60.

If there are more than two waypoints, the route calculation object is used to calculate a solution route for each leg of the entire route in the manner described above. Thus, each solution route calculated in this manner forms only a part of the entire final solution route. Therefore, if there is a single intermediate waypoint, a solution route is determined by the route calculation object 50 in the manner described above for the portion of the entire route between the origin and the intermediate waypoint. Then, another solution route is determined by the route calculation object 50 in the manner described above for the portion of the entire route between the intermediate waypoint and the destination waypoint. The list of segments 500 for each of these solution routes between each of the waypoints is stored serially in the route calculation object 50 in order to form the entire solution route that links all the waypoints.

Figure 16:
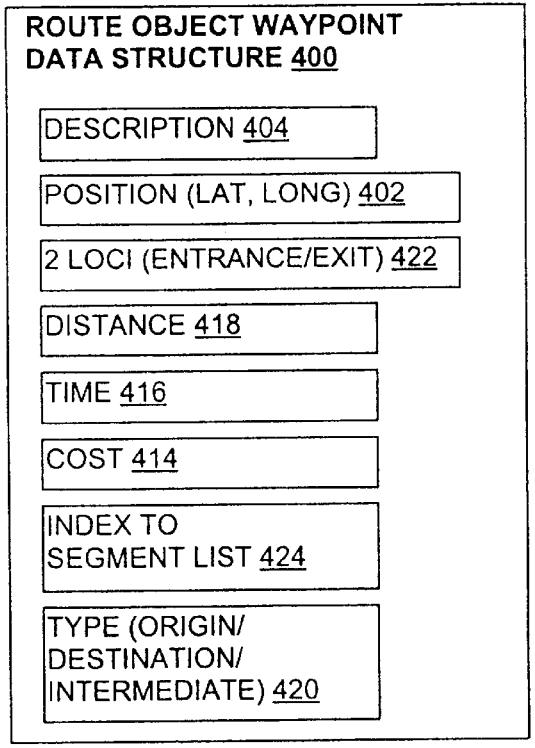
FIG. 16 is a diagram illustrating the components of the waypoint structure which is stored in the route object of FIG. 7.

As mentioned above in connection with FIG. 7, the route object 60 also includes a list 60(2) that includes route object waypoint data structures 400. This list 60(2) is developed and included in the route object 60 as the route calculation object 50 calculates the legs of the solution route between each waypoint pair for the entire route. There is an entry in the list 60(2) of route object waypoint data structures 400 for each waypoint in the final entire route. The data included in each route object waypoint data structure 400 is illustrated in FIG. 16. The data included in each route object waypoint data structure 400 includes some or all the data that had been developed and included in the route calculation object waypoint data structure 450 during route calculation.

In addition to the items of data from the route calculation object waypoint data structure 450, the route object waypoint data structure 400 includes several additional items of information. For example, the route object waypoint data structure includes an index 424 to the segment list 60(1). This index 424 to the segment list 60(1) is used in the route object 50 to indicate to which segment in the list of segments 60(1) of the route object 60 the waypoint corresponds.

The route object waypoint data structure 400 includes data 420 that specifies what type of waypoint the route object waypoint data structure 400 represents. For example, the data 420 may specify that the route object waypoint data structure 400 represents an "origin", a "destination", or an "intermediate" waypoint. Other suitable types may be defined. This data 420 is derived from the navigation application 47 by way of the waypoint objects 100 provided to the route calculation object 50.

The route object waypoint data structure 400 also includes data 422 that identifies one or two loci 92. This data 422 in the route object waypoint data structure 400 is used to indicate the entrance, exit, or both an entrance and an exit, of the waypoint represented by the route object waypoint data structure 400. For example, if the route object waypoint data structure 400 represents the origin waypoint, the data 422 identifies the locus 92 that represents the exit from the origin waypoint to embark upon the calculated route. For the route object waypoint data structure 400 that represents the destination waypoint, the data 422 identifies the locus 92 that represents the entrance into the destination waypoint to complete the calculated route. For intermediate waypoints, the data 422 may identify one or two loci 92. It may be required that an intermediate waypoint be entered at one location and exited at another. Thus, if the calculated route identifies a separate entrance into and exit from an intermediate waypoint, the route object waypoint data structure 400 that represents the intermediate waypoint includes two loci 92 in the data 422 to represent the separate entrance into and the exit from the intermediate waypoint. Since it is possible that an intermediate waypoint can be entered and exited from the same location, the route object waypoint data structure 400 that represents an intermediate waypoint may include only one locus 92 in the data item 422.

III. Alternate Features of the Route Calculation Tool

Although the embodiments of the route calculation tool 40, described above, provide for significant advantages for route searching when used as part of a navigation application program 18, many of the significant advantages and benefits derive from the features that the tool enables or makes more efficient. Some of these features are described below.

A. Implementing rank suppression

One present embodiment of the route calculation tool provides for implementing a rank suppression feature. When a rank suppression feature is implemented with the route calculation tool, a quality solution route can be found quickly. Rank is described above in connection with FIG. 2. As mentioned above, each road segment is assigned a rank (e.g., 0–4) which corresponds to a functional classification of the represented road. When using the rank suppression feature with one present embodiment of the route calculation tool, segment data records having a rank below a certain threshold rank are suppressed during a portion of the route calculation process, thereby reducing the amount of time needed to find a quality solution route. As described below, there are several different ways that the route calculation tool can implement rank suppression.

As described above, during route calculation when gates are being expanded in each search tree, the map database 30 is queried for the purpose of determining valid successor gates. In one embodiment, an examination is made of each segment record that has as one of its endpoints the target node of the gate being expanded to determine whether it can be used to form a valid successor gate. In one embodiment, the rank suppression feature is implemented to reduce the number of possible gates to examine and create during route calculation. By reducing the number of possible gates being examined and created, processing time is reduced and generally a solution route can be found more quickly. As implemented in the route calculation tool, rank suppression uses predetermined criteria to specify under which conditions rank suppression applies. When properly implemented, the rank suppression feature eliminates from consideration possible gates that are not likely to form part of a solution route. However, by suppressing the formation of these gates using rank suppression, the need to evaluate these gates, in the priority queue for example, is obviated thereby reducing processing time.

In one embodiment, the rank suppression feature is configurable. Configuration parameters for rank suppression may be stored in the configuration object 64 or may be programmed into the route calculation tool 40. The configuration parameters may include some or all of the following:

(a) the distance (of the gate) from the origin waypoint (for the inbound search tree);

(b) the distance from the destination waypoint (for the outbound search tree);

(c) the distance from the gate of the outbound tree that is closest to the destination waypoint;

(d) the distance from the gate of the inbound tree that is closest to the origin waypoint;

(e) the density of the road network (which may be measured by the rate of the geographical growth of the search tree);

(f) the total number of nodes expanded in the search tree; and (g) the highest rank of the gate in the inbound tree (this only applies for the outbound tree).

In general, these parameters configure the rank suppression feature so that it begins suppressing gates at some point after some initial number of gates have been expanded. In general, rank is not used to suppress gates close to a waypoint.

By suppressing the segment data records of certain ranks at certain stages of the route calculation process, the route calculation tool avoids the computations associated with forming gate structures for the suppressed segments, thereby speeding up the process of finding a solution route.

(1). Logical and physical rank suppression Rank suppression may be implemented either logically or physically. Using logical rank suppression, the route calculation tool 40 (in FIG. 4) uses layer "0" of the map database 30 (in FIG. 2) during route calculation. Map database layer "0" contains road segment data records representing road segments of all ranks. Logical rank suppression may be applied as part of the step of forming valid successor gates. As mentioned above, during route calculation, the map database 30 is queried for the purpose of determining valid successor gates. As described above, each segment record that has as one of its endpoints the target node of the gate being expanded is examined to determine whether it can be used to form a valid successor gate. To implement logical rank suppression, as each of these segment records is being examined, an additional test (or filtering) step is applied that suppresses any segment record having a rank below a configurable specified rank. This effectively prevents any successor gate being formed in the direction along a road segment connected to the target node being expanded when the road segment record that represents the road segment has a rank below the specified rank. This method of logical rank suppression can be implemented rigidly or flexibly. Rigid rank suppression always suppresses consideration of segment records having a rank below a specified rank when the criteria are met. Flexible rank suppression can be operated dynamically taking into account various other criteria.

Using physical rank suppression, the road segment records are retrieved only from the layer of the map database 30 that contains segment records at or above the specified rank. By eliminating segment records of lower ranks from consideration in route searching, fewer road segment records need be evaluated or explored to determine the solution route (i.e., fewer gates will be generated in the search tree for expansion). The layer to be used may be determined for each gate independently of the layers used for the other gates.

Figure 21:
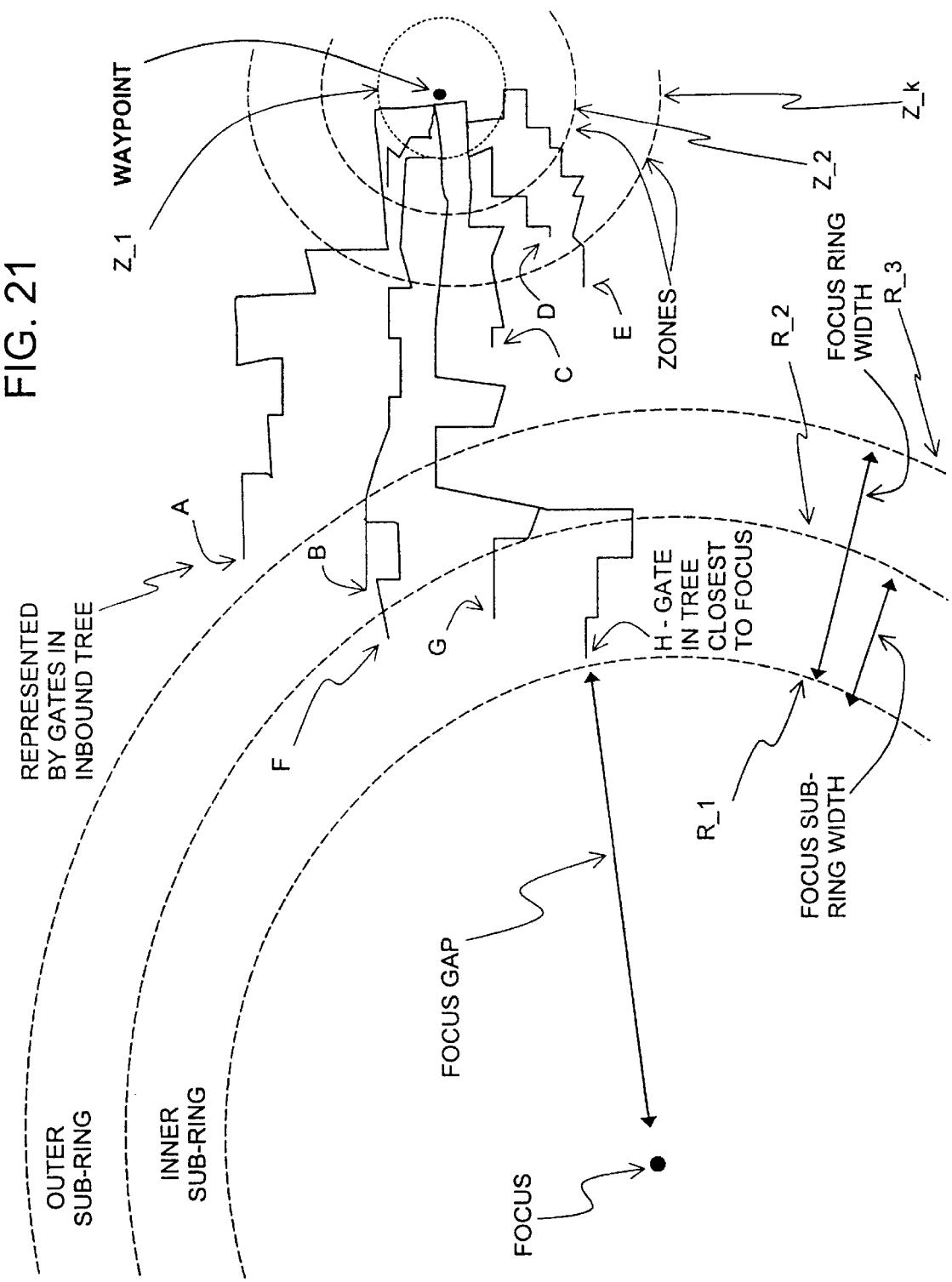
FIG. 21 is a map illustrating the concepts associated with a rank suppression feature according to one alternative embodiment of the route calculation program.

(2). Alternative rank suppression implementation According to one embodiment of the route calculation tool that uses rank suppression, a suppression strategy is based on the distance of the geographical position of a road segment relative to the specified start and end locations of the journey. Referring to FIG. 21, there is a map that illustrates the concepts associated with this embodiment. FIG. 21 shows road segments leading from one of the waypoints. In this figure, the waypoint is the destination. These road segments represented in FIG. 21 are represented by gates in the inbound search tree. These road segments illustrate the condition of the inbound search tree after it has been grown by expanding gates. (For the sake of clarity, the road segments that are represented by gates in the outbound search tree are not illustrated in this figure. It is understood that there is at least one gate that represents at least one segment in the outbound search tree.)

As described above, when each search tree object is formed, it is associated with a focus. The focus of a search tree is the point toward which it is configured to grow. The focus is configurable so that it can be determined to be any point. Referring to FIG. 21, there is illustrated a focus of the inbound search tree. In the map of FIG. 21, the focus may be chosen to correspond to the position of the origin or to any other point, such as a point on the outbound search tree.

During operation, the route calculation tool defines one or more zones. Each zone is defined by a zone boundary $Z\_1$, $Z\_2 \ldots Z\_k$. The zone boundaries are circular-shaped areas encircling the waypoint from which the search tree grows. The width of each zone may be fixed, or may be varied as a function of the density of the local road network, as described below.

When the route calculation tool implements rank suppression using zones, any road segment outside the outermost zone boundary $Z\_k$ is eliminated unless it is of the highest rank. Elimination of any other road segment depends on its rank and the corresponding zone in which it is located. Thus, within the innermost zone, $Z\_1$, all road segments of all ranks are used, i.e., no ranks are suppressed. Outside zone $Z\_1$, but within zone $Z\_2$, road segments of rank 0 are suppressed, but all other road segments may be explored. At each larger zone, another corresponding rank of road segments is suppressed. (The number of zones may be equal to the number of ranks, or may be different. For example there may be fewer zones than ranks and more than one rank maybe suppressed when moving outward from one zone to another.)

As mentioned above, the sizes of the zones may be determined based upon the density of the road network in the vicinity of the waypoint. The density of the road network can be determined as the search tree is being grown. As the inbound search tree is grown by expanding gates, a road density value is determined by comparing the number of gates that are in the inbound search tree (also referred to as the "tree height") to the distance of the gate being expanded from the waypoint of the search tree. For example, in a relatively dense road network, such as in an urban area, there are many road segments per square kilometer. Therefore, as the search tree is being grown, a relatively small actual distance is traveled from the waypoint compared to a relatively large number of road segments that are examined in the vicinity of the waypoint. On the other hand, in a relatively sparse road network, such as in a rural area, there are few road segments per square kilometer. Therefore, as the search tree is being grown, a relatively large distance is traveled from the waypoint compared to the number of road segments examined in the vicinity of the waypoint.

Accordingly to one embodiment, a default size is selected for one or preferably each of the zones. These default sizes are selected to be the smallest permitted sizes for the widths of each of the zones. These smallest permitted sizes would correspond to the sizes of each the zones in a dense road network, such as in an urban area. These default sizes may be stored as parameters in the configuration object or elsewhere in the navigation system. Then, during route calculation as the search tree is being grown, a determination is made of the road density at some interval of tree growth. This interval may correspond to when each gate is added to a search tree, or after every ten gates are added to a search tree, or after every hundred gates are added to a search tree, and so on. (The interval may also be stored as a configuration parameter.) At each interval, a road density determination is made by comparing the tree height (i.e., where the height of the search tree corresponds to the total number of gates in the search tree) to the distance from the waypoint of the most recently added gate. If the road network is relatively sparse, a relatively large distance will have been traveled from the waypoint for a given number of gates. This distance is compared to a distance traveled from the waypoint for the same number of gates in a dense road network, such as the one used to model the default zone width. If this comparison indicates that the road network is relatively sparse, the zone size is increased. This may be accomplished by applying a proportionate scaling factor to the default zone size. Thus, if a default zone boundary size, $Z\_\text{default}$, of 1–2 kilometers is established for the innermost zone boundary, $Z\_1$ (wherein the default size corresponds to a preferred size of the innermost zone boundary Z__1 in a dense road network), and the road network is measured to be relatively sparse, the size of the inner zone boundary Z__1 may be increased proportionately by a factor related to the road network density.

The proportionate scaling factor to be applied may be based upon empirical or experimental analysis. For example, experiments may show that an inner zone width of 10 km provides the best and fastest routes for rural areas and that an inner zone width of 1.5 km provides the best and fastest routes for urban areas. If the route calculation tool measures a road density that is between these two extremes, an appropriate scaling factor is applied to determine a size between 10 km and 1.5 km for the zone width proportionate to the measured density. It is noted that different default zone sizes may be appropriate for different countries or regions within a country. These default zone sizes may be determined experimentally.

According to one implementation of this embodiment, rank suppression is also applied outside of the outermost zone in a manner to improve calculation of quality routes. During operation of the route calculation tool, when gates are being expanded in a search tree, the route calculation object defines a focus gap. The focus gap of a search tree is defined to be the distance from the focus of the search tree to the gate in the search tree closest to the focus. The focus gap is used as a search reference parameter by the route calculation object and is updated, if necessary, at each step of tree growth. FIG. 21 shows the unexpanded gate H, on the inbound search tree that is closest to the focus. FIG. 21 also shows the focus gap. (This method disclosed in this embodiment may be used in implementations that do not include gates, search trees, or similar structures.)

During operation, the route calculation tool defines a focus ring. A focus ring is a donut-shaped area at a calculated distance from the focus and encircling the focus of the search tree. A focus ring is shown in FIG. 21. The focus ring in FIG. 21 is defined between R__1 and R__3. The inner boundary of the focus ring, R__1 corresponds to the focus gap. The outer boundary of the focus ring R__3 is calculated during route calculation, as explained below.

In between the inner and outer boundaries, R__1 and R__3, of the focus ring, the focus ring may be partitioned into a set of nested sub-rings. In FIG. 21, two nested sub-rings are shown. An inner sub-ring is defined between R__1 and R__2, and an outer sub-ring is defined between R__2 and R__3. In further embodiments, additional sub-rings may be used.

When the route calculation tool implements rank suppression using a focus ring, any road segment located outside the outer boundary R__3 of the focus ring is suppressed unless it is of the highest rank. Thus, referring to FIG. 21, the road segments labeled A, C, D, and E are shown to be located outside the outer boundary R__3 of the focus ring. Unless these road segments, labeled A, C, D, and E, are of the highest rank (i.e., rank 4 in one embodiment), these segments are suppressed from further consideration as potential solution routes.

Elimination of any other road segment depends on its rank and the corresponding sub-ring in which it is located. For example, referring to FIG. 21, within the innermost sub-ring, which is defined as the region between R__1 and R__2, no road segments are suppressed. In FIG. 21, the road segments labeled F, G, and H are shown to be located within the inner sub-ring between R__1 and R__2. According to this embodiment, the road segments labeled F, G, and H, are not suppressed, even if they have a low rank. For example, if the road segment labeled F is a rank 0 road, it is not suppressed because it is in the innermost focus ring. Thus, the road segments labeled F, G, and H are maintained as available gates in the inbound search tree.

The suppression of a road segment depends upon its rank and the sub-ring in which it is located. For example, in FIG. 21, the road segment labeled B is in the sub-ring between R__2 and R__3. This road segment B is suppressed if it is has a rank of 0, but is not suppressed if it has a rank greater than 0. (In FIG. 21, only two sub-rings are shown for the sake of clarity, but in a present embodiment, the number of rings may be equal to the number of ranks.) A road segment of rank i will be eliminated if it is not in ring R__i or a ring smaller than R__i.

Using this embodiment, all road segments are searched in small neighborhoods of the start and end locations (which correspond to the waypoints of each search tree). At each tree growth step, the route calculation tool updates a set of parameters which are used to guide the search. At each gate expansion, the search tree is augmented with only those successor gates formed from unsuppressed road segments.

Using this embodiment, a road of low or medium rank can be evaluated for a solution route if its geographical distance to the tree focus point is shorter than the tree focus gap plus the focus ring width. As can be appreciated from examining FIG. 21, by not suppressing lower ranked segments within the focus ring, there exists the possibility that promising lower ranked roads may be incorporated into a solution route. In order to be used in a solution route, a route that incorporates such lower ranked roads would still have to provide a lower overall cost compared to any of the other potential routes being explored. However, using the disclosed embodiment, lower ranked roads may be considered even if they may be located relatively far from a waypoint. This embodiment still suppresses consideration of lower ranked roads that are unlikely to form low cost solution routes, such as the roads outside the outer boundary of the focus ring. Thus, by selectively suppressing roads in this manner, a quality route can be calculated relatively quickly.

As mentioned above, the sizes of the focus ring and its sub-rings are based upon the density of the road network. As described above in connection with determining the sizes of the zones around the waypoint, the density of the road network can be determined as the search tree is being grown. As the inbound search tree is grown by expanding gates, a road density value is determined by comparing the number of gates that are in the inbound search tree (also referred to as the "tree height") to the distance of the gate being expanded from the waypoint of the search tree.

Like the zones, default sizes may be selected for the focus ring and its sub-rings. These default sizes are selected to be the smallest permitted sizes for the widths of the focus ring and its sub-rings. These smallest permitted sizes would correspond to the sizes of the focus ring and its sub-rings in a dense road network. A default focus ring width of 5 km may be used with the sizes of each of the sub-rings proportionate to the size of the entire focus ring. These default sizes may be stored as parameters in the configuration object or elsewhere in the navigation system.

As the search tree is being grown, a determination is made of the road density at some interval of tree growth, as described above. A road density determination is made by comparing the tree height to the distance from the waypoint of the most recently added gate. If this comparison indicates that the road network is relatively sparse, the widths of the focus ring and sub-rings are increased. This may be accomplished by applying a proportionate scaling factor to the default ring sizes. Like the sizes for the zones, a proportionate scaling factor to be applied may be based upon empirical or experimental analysis. For example, experiments may show that a focus ring width of 10 km provides the best routes quickly for rural areas and that a focus ring width of 5 km provides the best routes quickly for urban areas. If a road density is measured that is between these two limits, an appropriate scaling factor is applied to determine a size between 5 and 10 km for the focus ring width proportionate to the measured density between these limits. It is noted that different default sizes may be appropriate for different countries or regions within a country. These default ring sizes may be determined experimentally.

There are several distinct advantages associated with the disclosed rank suppression embodiment. A route calculation program utilizing this rank suppression feature has the potential to out perform other route calculation programs in quickly finding routes of high quality, especially for hard problem instances. First, with this embodiment, a main portion of the search is conducted in a relatively small zone region of the waypoint of the search tree towards a focus point. This significantly reduces amount of memory used as well as route calculation time. Second, the present embodiment allows searching roads of medium or low rank as they appear to be promising in a poorly connected road network. Thus, the present embodiment is more likely to finds routes of high quality than prior route calculation programs. In a poorly connected road network, any route of reasonable quality is required to use some lower ranked roads. For long range route calculations, prior algorithms may fail to find quality routes because they search only high ranked roads in the middle of the journey. With the present embodiment, the search for a route can readily use lower layers as well as higher layers of data, even along a middle portion of a calculated route.

B. Rerouting

Another feature provided by a present embodiment of the route calculation tool is an improved rerouting feature. The rerouting feature may be used when the vehicle in which the navigation system is installed departs from the originally calculated solution route as the vehicle is traveling. According to one embodiment of the rerouting feature, after the route calculation tool 40 determines a solution route and provides the solution route in a route object 60 to the navigation application 47, the inbound search tree 141(IN) is augmented by adding to it any portion of the outbound search 141(OUT) tree that formed part of the solution route. After this step, the now augmented inbound search tree contains the original inbound search tree as well as any gates that were part of the original solution route but which were in the outbound search tree. This augmented inbound search tree is maintained in the memory 20 (in FIG. 1) of the navigation system 10 or is otherwise stored while the vehicle is traveling the roads represented by the solution route.

For purposes of this example, it is assumed that the destination has not changed, but that for some reason, intentionally or otherwise, the vehicle is no longer traveling on the roads corresponding to the solution route. The rerouting feature of the route calculation tool 40 is implemented upon detection by the navigation system that the vehicle is no longer traveling on any of the roads represented by the solution route (or is no longer traveling in the proper direction on the roads represented by the solution route). In one embodiment, this detection is made in a map matching program that is part of the navigation application 18. As the vehicle is traveling, the map matching program correlates the geographic coordinates derived from the positioning system 14 (in FIG. 1) with the road segment data records in the map database 30. This may be done for the purpose of providing the end-user with driving instructions in advance of when a maneuver is required as part of the solution route. This may also be done on a continuous basis (or at predetermined intervals) for the purpose of displaying the position of the vehicle on a computer display that is part of the user interface. As the map matching program determines which segment record in the map database corresponds to the vehicle position, it compares this segment record to the list of segment records in the solution route. If the vehicle position corresponds to a segment record that is not among the records in the solution route (or if the direction of travel is incorrect), the rerouting feature of the route calculation tool is called. The rerouting feature may be implemented as a separate program in the navigation application 18 or may be implemented as a function or object within the route calculation tool 40. In a one embodiment, a rerouting function in the navigation application 47 prompts the end-user to indicate whether he or she wants a new route (e.g., a re-route) to be calculated. Alternatively, the reroute function can be implemented automatically without waiting for the end-user to request that rerouting be performed.

In one embodiment, a navigation position object (e.g. 56 in FIG. 4) is provided that corresponds to the present position of the vehicle. The rerouting feature may request this information from the geocoding program tool 90 which may be used for this purpose. The geocoding tool 90 may obtain the coordinates of the vehicle position from the map matching program. Alternatively, the geocoding tool 90 may obtain the position of the vehicle from the navigation application 47 which in turn obtained the coordinates determined by the positioning system 14.

Once the navigation position object 56 corresponding to the current vehicle position is obtained, it is provided to the navigation application 47. The navigation application 47 creates a waypoint object 100 and provides it to the route calculation tool 40 which is operated in a rerouting mode. According to one embodiment, operation of the route calculation tool 40 in the rerouting mode is similar to the operation for normal route searching. An inbound search tree object 140(IN) and an outbound search tree object 140(OUT) are formed by the route calculation object 50. The route calculation object 50 uses the waypoint object 100 that represents the current vehicle position to obtain portal information from which seed gates 108 can be determined for a new outbound search tree 141(OUT). These new seed gates and immediate successor gates of these seed gates are determined and added to a new outbound search tree 141 (OUT) in a new outbound search tree object 140(OUT). As mentioned above, the inbound search tree 141(IN) is the augmented inbound search tree that contains the previously calculated inbound search tree for the original solution route as well as any gates that were part of the original solution route but which were in the original outbound search tree 141(OUT). As in a normal search, the gates in these new inbound and outbound search trees are compared to determine whether the same gate exists in both the new inbound and outbound search trees. If it does, a solution route exists and the list of segments that form the solution route is placed in an output route object 60.

If a solution route was not found in the previous step, the inbound tree 141(IN) is grown. The current vehicle position may be used as the focus 143(IN) of the inbound search tree 141(IN). Pointers to all the unexpanded gates in the new inbound search tree 141(IN) are stored in a new inbound priority queue object 150(IN). As in the first described embodiment, any suitable route searching algorithm may be used to establish a priority among the unexpanded gates in the inbound search tree. When used for rerouting, the route searching algorithm evaluates each of the positions of the unexpanded gates relative to the focus 143(IN) which in the rerouting mode corresponds to the current vehicle position. (An alternate priority algorithm may be used during rerouting to give higher than usual priority to gates that are close to the new origin. Since the new origin is usually near the old route, this tends to cause the new route to converge to the old route more quickly.)

The gate in the inbound search tree 141(IN) with the highest priority as listed in the inbound priority queue object 150(IN) is expanded. As in the normal mode of operation, the candidate successor gates are examined to determine whether valid successor gates can be formed. The new successor gates are also examined to determine whether any of them match a gate in the outbound search tree, and if any one of them does match, a solution route is found. If there is no match, these valid successor gates are added to the inbound search tree. The inbound tree continues to be grown in this manner until a solution route is found. Then, the new solution route is placed in a new output route object. In a preferred embodiment, only the inbound tree is grown until a solution is found (i.e., the outbound tree is not searched).

Several advantages are provided by this rerouting feature of the route calculation tool. If a seed gate (or its successor gates) of the current vehicle position is already contained in the augmented inbound search tree, then the route to the destination waypoint is already known and can be identified immediately. Also, if the seed gate (or its successor gates) for the current vehicle position is not already contained in the augmented inbound search tree, but the vehicle position is within the geographic area represented by the gates of the augmented inbound search tree 141(IN), a solution route to the destination waypoint can be determined very quickly, because only minimal searching will be required to expand the augmented inbound search tree to the position of the vehicle represented by a vehicle seed gate (or its successor gates).

In an alternative embodiment, the original solution route is placed in an input route object 72. When a previous route is used in this manner, it may be referred to as a nexus. A nexus is a list of segment records that together form all or part of a route. A nexus is used to constrain the route searching performed by the route calculation object 50. When a node of a nexus is encountered while route searching is being conducted, the nexus is followed from the encountered node to the end of the nexus, from which further route searching may be performed. Thus, when reroute searching is performed and a point on the original route (represented by the nexus) is encountered, the rerouting is constrained to follow the remainder of the original solution route to the destination waypoint. This provides an advantage since a determination had been made during calculation of the original route that such route represented the best route according to the chosen parameters.

The rerouting feature provided by a present embodiment of the route calculation tool 40 provides a significant advantage over prior route searching programs. In prior programs, searches for rerouting were performed from the vehicle position to the destination. However, since the vehicle's position is continually changing as the vehicle moves, rerouting searches required the route calculation application to predict an origin of the search ahead of the vehicle. The present embodiment avoids the need to predict an origin ahead of the vehicle because the rerouting search is performed from the existing inbound tree towards the changing vehicle position or focus. This calculation can be performed relatively quickly because the vehicle position waypoint (used as the focus of the inbound search tree) represents a relatively small item of information that changes. The larger amount of information resides in the inbound search tree, which does not need to be changed.

C. Multiple Solutions

Another feature provided in an alternative embodiment of the route calculation tool 40 is the provision for multiple searches. According to this feature, searching can be continued by the route calculation tool 40 after a first solution route is determined thereby creating multiple solution routes. The route calculation tool 40 then chooses the solution route with the lowest cost. According to this alternative embodiment, the route calculation tool 40 is configurable so that more than one solution route can be determined and also so that the solution route delivered to the end-user is chosen according to a user-specified cost function. In one alternative embodiment, the end-user is then allowed to choose which of the alternative solutions to accept.

As discussed above, the gates in the priority queues are ordered according to the highest priority. The priority thus determines the direction in which the respective search tree grows because, where multiple paths exist, the one leading to the gate with the highest priority is the one next expanded. One advantage provided according to this alternative embodiment is that the priority is configurable and may be defined distinct from the cost of traveling to the gate in question. For example, priority may be based on the map data in local memory, thereby giving higher priority to node and segment records which can be read quickly from memory. This may provide a performance advantage over systems where additional map data are required to be read from the medium on which the map data are stored.

D. Multiple Intermediate Waypoints

Another advantageous feature that may be provided by an alternative embodiment of the route calculation tool 40 is the determination of routes passing through multiple intermediate waypoints. To provide for one or more intermediate waypoints, the first intermediate waypoint is treated as a destination waypoint, and a route is determined between the origin waypoint and the first intermediate waypoint according to the method described above. Once a solution route to the first intermediate waypoint is found, the first intermediate waypoint is treated as the origin waypoint and the second intermediate waypoint is treated as a destination waypoint. The route searching method described above is again repeated, and so on, until a solution route is determined between the last intermediate waypoint and the ultimate destination waypoint. At that stage, the route calculation engine 160 concatenates the routes determined between the various waypoints to provide a single route from the origin waypoint to the destination waypoint passing through all of the intermediate waypoints. Customized information about the road network, such as nexuses and masked segments are retained for each leg of the route calculation.

E. Alternate routes

A further feature provided in an alternative embodiment of the route calculation tool 40 is the generation of alternate routes. These alternate routes can then be reported by the navigation application program 18 to the end-user.

For determining alternate routes, a first solution route is found according to any of the methods described above. Then, the costs of traversing the road segments that comprise the first route are increased. Segments having these artificially raised costs are called "masked segments." The previously described route searching method is then repeated to calculate a second or alternate route. When gates of the first route are encountered in the search tree, they will have higher costs than when previously encountered. These higher costs will be reflected in the priority assigned to each of these gates in the priority queue. These higher costs reduce the likelihood that any of the gates from the original solution route will be selected thus helping to ensure that an alternate route will be found with only minimal overlap between the original and alternate routes. Once a second route is determined, its segments may be masked and the procedure may be repeated to determine yet another additional alternate routes, and so on.

The provision for alternate routes has an advantage that alternate routes can be determined without altering the optimization criteria. This means that the alternate route can still be optimized for the same criteria (e.g., time, distance, etc.), but still represent another route to the destination.

F. Progress callback feature

Another advantage provided by an embodiment of the route calculation tool is a progress callback feature. The progress callback feature allows the navigation application 47 to interrupt the route calculation function when it appears to be taking too long or when the navigation application 47 needs the allocated memory or processor for other higher priority functions. In providing this feature, an embodiment of the route calculation tool 40 provides information to the navigation application program at defined intervals. For example, the route calculation tool 40 may provide information each time a gate is expanded, or after every ten gates have been expanded, and so on. This permits the navigation application 47 to interrupt the route calculation tool 40, as needed, but also allows the navigation application 47 to provide a partial solution route which can be used for various purposes, such as map display.

G. Real time traffic weighting

An embodiment of the route calculation tool 40 also provides a mechanism for the navigation application 47 to incorporate real time traffic information in the route calculation determination. The route calculation tool 40 may provide for accepting input about the cost of traversing a segment taking into account traffic conditions. For example, the cost of a segment may be increased due to rush hour traffic or an inhibiting traffic incident. This information may be provided to the navigation system by wireless transmission from a traffic monitoring service. The route calculation object 50 can check and account for such traffic information as each gate is expanded in a search tree.

H. Use of nexus routes

As mentioned above, a route object can be used as an input ("72" in FIG. 4) to the route calculation object 50. When used in this manner, the previous route is incorporated as part of a new route being calculated. When a previous route is used in this manner, it is referred to as a nexus, as mentioned above. A nexus is used to constrain the route searching performed by the route calculation object. When any location along a route represented by a nexus is encountered while route searching is being conducted, the nexus is followed from the point of encounter to the destination end of the nexus. Further route searching may be performed from the destination end of the nexus. A route object used as a nexus includes an entire route and may have a format identical to the route object. The route object used as a nexus may be a route object previously calculated by the route calculation tool or may be provided by another source.

There are a number of uses for nexus routes. These uses include providing a previously determined preferred route. The previously determined preferred route may be a user-configurable preferred route, or alternatively may be determined to be preferred by the navigation application or the provider of the geographic database.

Another use for a nexus route includes re-routing. The original route can be used as a nexus. When performing re-routing using a nexus, the new re-routing route is calculated to the original route, not to the original destination. When the re-routing route encounters the original route, the original route is followed to its destination.

Nexus routes may also be used for long, predefined routes, such as routes between cities. These predefined routes may be stored in the geographic database 30.

Another use for nexus routes is scenic routes. These scenic routes may also be predefined and stored in the geographic database.

I. Multiple origins and destinations

Another feature provided by the disclosed embodiments of the route calculation tool is that they readily accommodate finding solution routes that have multiple origins, multiple destinations, or both multiple origins and destinations. As mentioned above, when the route calculation object 50 forms the inbound and outbound search tree pair to be used for determining a solution route for a leg of an overall route, it starts by adding one or more seed gates to each search tree. Each of these seed gates represents an initial means of access out of (or into) one of the portals of its respective waypoint. The route calculation tool is not limited to using only one waypoint in each search tree. Multiple waypoints can be used with each search tree. When using multiple waypoints in a single search tree, seed gates are formed for each portal of each waypoint and all these seed gates added to the single search tree. Then, the route calculation object operates as described above to determine a solution route between the waypoints.

Using the route calculation tool to find a solution route between multiple origin waypoints and/or multiple destination waypoints can be applied to a variety of situations. For example, a delivery service may have several vehicles at different locations that can be called to make a pickup at a particular place. A navigation system incorporating the route calculation tool 40 may be located at a central dispatching facility. Origin waypoint objects are formed to represent the locations of each of the vehicles and a destination waypoint object is formed to represent the place of pickup. These multiple waypoints objects are provided to the route calculation object in the route calculation tool. The route calculation object forms seed gates for each of these multiple origin waypoint objects. The seed gates formed from the portals of the multiple waypoint objects that represent the vehicle positions are added to a single outbound search tree. The seed gates formed from the portals of the waypoint object that represents the pickup location are added to the inbound search tree.

A solution route is determined, as described above. When the routing algorithm is applied to determine which gates to expand, the gates of the multiple origins are automatically weighed against each other. A solution route is found that minimizes cost, regardless of the number of origin locations.

Multiple origin waypoints and/or multiple destination waypoints can also be used to find the lowest cost route to any of a variety of destinations. For example, if an end-user wants to visit any one of four restaurants, each of these restaurants can be represented by a destination waypoint. Four destination waypoint objects are formed and seed gates for each are added to an inbound search tree. The route calculation tool is operated and a solution route of minimum cost is found to one of the restaurants.

IV. Advantages of the Disclosed Embodiments

An advantage provided by the disclosed embodiments is derived from the use of a waypoint to represent a location, such as the origin, the destination, and any intermediate stops. Waypoints are used to calculate routes with more precision and more consistently than was possible with prior systems. As mentioned above, the map database 30 contains node data records and segment data records. The node data records represent positions at the ends of road segments and include data identifying the geographical coordinates (latitude and longitude) of these positions. Segment data records represent portions of roadways between positions represented by node data records. A waypoint (which can represent an origin, a destination, or an intermediate location along a route) is not necessarily located at an end of a road segment, but instead may be located anywhere in the geographic region, including along portions of roadways between intersections. Since a portion of the roadway located between nodes is represented by a segment data entity, the physical location represented by a waypoint is associated with a position along a portion of a roadway represented by a segment data record in the map database 30. One benefit that results from the use of waypoints is that a means is provided to provide route calculation and guidance to locations between nodes (e.g., along segments), and more particularly, precisely to the entrance and exits of points of interest and other locations.

Using the gates allows the route calculation tool 40 to define both a position and a direction. By contrast, in prior systems that used only nodes and edges, it was necessary to create multiple additional nodes at an intersection to define a direction with attributes or conditions, such as turn restrictions, to accurately define the permissible routes of travel. In a present embodiment, a gate defines a node and a direction from that node towards the node at the other end of the segment, thereby linking the two nodes by a defined path. The gate may also include a segment identifier (e.g., "ID") that uniquely identifies the path between the two nodes.

Another of the advantages provided by the route calculation tool is that it is able to provide instructions at a finer level of detail than previous navigation programs.

Still another advantage provided by an embodiment of the navigation tool is that it is preferably an object oriented application. Using an object oriented approach, the route calculation program can be adapted for use in various different kinds of navigation systems with little or no modification.

Present embodiments provide a concise data model used for searching optimum routes in a complex road network. This data model includes search trees and data structures such as gates, waypoints, and portals. These structures enable the navigation application to provide detailed instructions to an end-user in a road network with various constraints such as irregular start and end locations. Conventional approaches (e.g., graph theory applications) would require data models of much larger size in these types of road networks.

Present embodiments also provide a new road search suppression heuristic developed for speeding tip the search, especially for long range route searches. Low rank roads are quickly eliminated from consideration except in a generic ring shaped region relative to a specified focus point (e.g., the origin, the destination, or an intermediate waypoint). The size of the main search region is relatively small, depending on the road structure and the search position. Moreover, this generic search region is configurable with a set of tunable parameters for further performance improvement. The search heuristic significantly reduces route calculation time and memory usage while it finds routes of high quality.

It is intended that the foregoing detailed description be regarded as illustrative rather than limiting and that it is understood that the following claims including all equivalents are intended to define the scope of the invention.

We claim:

1. A method of performing a rerouting function using a navigation system having a route calculation program that uses a map database that includes road segment records that represent portions of roads in a road network in a geographic region, comprising the steps of:

after calculating a solution route from a first location in said geographic region to a second location in said geographic region, wherein said solution route is represented by a list of road segment records, storing an inbound search tree formed of a plurality of gates, wherein each gate represents a physical location on said road network and an accessible direction relative to said physical location, and wherein said plurality of gates in said inbound search tree represent segments of roads of said road network from which said second location is accessible, upon said navigation system having departed from the solution route, providing data representing a physical location of said navigation system; and growing said inbound search tree until at least one successor gate of the plurality of gates in said inbound search tree corresponds to said data representing the physical location of said navigation system.

2. The method of claim 1 wherein each gate identifies an associated segment of a road by referring to a segment database ID.

3. The method of claim 1 wherein each gate identifies an associated segment of a road with a pointer.

4. The method of claim 1 wherein, in each gate, the accessible direction is reverse from a direction of vehicle travel.

5. The method of claim 1 wherein each gate also includes a reference to a predecessor gate.

6. The method of claim 1 further comprising:

after calculating the solution route from the first location to the second location, augmenting the inbound search tree by adding thereto that portion of an outbound search tree that formed part of the solution route.

7. The method of claim 6 further comprising:

maintaining in a memory of the navigation system the inbound search tree as augmented with the portion of the outbound search tree.

8. The method of claim 1 further comprising:

providing a user of the navigation system with guidance for following a route to the second location from the physical location of the navigation system.

9. The method of claim 1 further comprising:

prompting a user of the navigation system to indicate whether a new route should be calculated upon detection that the navigation system departed from the solution route.

10. A method of providing an alternative route using a navigation system having a route calculation program that uses a map database that includes road segment records that represent portions of roads in a road network in a geographic region, wherein said alternative route has minimal overlap with an original solution route, the method comprising the steps of:

after calculating the original solution route between a first location in said geographic region and a second location in said geographic region, wherein said solution route comprises a list of road segment records that was obtained by forming at least one search tree formed of a plurality of gates, wherein each gate represents a physical location on said road network and an accessible direction relative to said physical location, incrementing a weighting associated with each of said gates in said at least one search tree that corresponds to said list of road segment records that comprise said solution route, wherein a lower weighting favors inclusion of said gate relative to a higher weighting;

growing the search tree by expanding gates to form successor gates; and evaluating which of said successor gates to select for further expansion using said incremented weighting until the alternate route is determined.

11. The method of claim 10 wherein the weighting indicates traffic conditions.

12. The method of claim 10 wherein each gate identifies an associated segment of a road by referring to a segment database ID.

13. The method of claim 10 wherein each gate identifies an associated segment of a road with a pointer.

14. The method of claim 10 wherein each gate also includes a reference to a predecessor gate.

15. The method of claim 10 wherein the weighting is provided to the navigation system by wireless transmission.

16. The method of claim 10 wherein the weighting is provided to the navigation system from a traffic monitoring service.

* * * * *